(12) United States Patent
Nagura et al.

(10) Patent No.: US 9,784,897 B2
(45) Date of Patent: *Oct. 10, 2017

(54) OPTICAL FILM, POLARIZING PLATE AND LIQUID CRYSTAL DISPLAY DEVICE

(71) Applicant: FUJIFILM Corporation, Tokyo (JP)

(72) Inventors: Masato Nagura, Kanagawa (JP); Mamoru Sakurazawa, Kanagawa (JP); Ryo Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,641

(22) Filed: May 29, 2015

(65) Prior Publication Data

US 2015/0346409 A1    Dec. 3, 2015

(30) Foreign Application Priority Data

May 30, 2014  (JP) ................................. 2014-113535

(51) Int. Cl.
*G02B 5/30* (2006.01)
*G02F 1/13363* (2006.01)
*G02F 1/1335* (2006.01)

(52) U.S. Cl.
CPC ........ *G02B 5/3083* (2013.01); *G02F 1/13363* (2013.01); *G02F 1/133528* (2013.01); *Y10T 428/105* (2015.01)

(58) Field of Classification Search
CPC . C08G 63/199; C08J 2367/02; C08J 2301/10; C08J 2301/12; C08J 5/18; G02B 1/14; Y10T 428/105
USPC .................... 428/1.33; 349/96, 122
See application file for complete search history.

(56) References Cited

U.S. PATENT DOCUMENTS

| | | | |
|---|---|---|---|
| 8,337,962 B2 | 12/2012 | Naito et al. | |
| 8,394,309 B2 | 3/2013 | Naito et al. | |
| 2011/0141429 A1* | 6/2011 | Hisakado | G02B 1/04 349/158 |
| 2011/0193260 A1* | 8/2011 | Takeda | B29C 33/60 264/213 |
| 2011/0223435 A1 | 9/2011 | Naito et al. | |
| 2011/0292324 A1* | 12/2011 | Kaihoko | C08B 3/06 349/96 |
| 2012/0088041 A1* | 4/2012 | Fukagawa | C09K 19/54 428/1.33 |
| 2012/0153542 A1 | 6/2012 | Naito et al. | |
| 2013/0107175 A1* | 5/2013 | Kamohara | C09D 101/02 349/96 |
| 2014/0057060 A1 | 2/2014 | Fukagawa et al. | |
| 2015/0232612 A1* | 8/2015 | Tajiri | C08G 63/199 106/170.33 |

FOREIGN PATENT DOCUMENTS

| | | | |
|---|---|---|---|
| JP | 2004-292696 A | 10/2004 | |
| JP | 2005-239916 A | 9/2005 | |
| JP | 2007-084692 A | 4/2007 | |
| JP | 2010-508551 A | 3/2010 | |
| JP | 2011126968 A * | 6/2011 | ........... G02F 1/1335 |
| JP | 2012-072348 A | 4/2012 | |
| JP | 2013-254190 A | 12/2013 | |
| JP | 2014-032386 A | 2/2014 | |
| JP | 2014-070159 A | 4/2014 | |
| WO | 2014/027594 A1 | 2/2014 | |

OTHER PUBLICATIONS

Notification of Reasons for Refusal, issued by the Japanese Patent Office dated Aug. 22, 2017, in connection with Japanese Patent Application No. 2014-113535.

* cited by examiner

*Primary Examiner* — Sophie Hon
(74) *Attorney, Agent, or Firm* — Edwards Neils LLC; Jean C. Edwards, Esq.

(57) ABSTRACT

An optical film having a thickness of from 10 to 45 μm and containing a cellulose ester, a polyester having a recurring unit represented by the formula 1A and having a blocked terminal, and a durability improving agent for a polarizer wherein Re and Rth are from −5 to 5 nm at a wavelength of 590 nm can be used as an polarizing plate protective film and is capable of ensuring the durability of the polarizer under a high temperature and high humidity environment. X represents an acyclic divalent linking group, R represents an alkyl, alkenyl, alkynyl or aryl group, and m represents an integer of from 0 to 4.

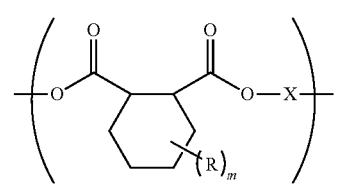

Formula 1A

10 Claims, No Drawings

OPTICAL FILM, POLARIZING PLATE AND LIQUID CRYSTAL DISPLAY DEVICE

CROSS-REFERENCE TO RELATED APPLICATIONS

The present application claims the benefit of priority from Japanese Patent Application No. 113535/2014, filed on May 30, 2014, the contents of which are herein incorporated by reference in their entirety.

BACKGROUND OF THE INVENTION

Field of the Invention

The invention relates to an optical film, a polarizing plate and a liquid crystal display device. More specifically, the invention relates to an optical film useful in a liquid crystal display, and a polarizing plate and a liquid crystal display device containing the optical film.

Background Art

A cellulose ester film, which is represented by a cellulose acetate film, has high transparency and thus has been used as an optical film for various purposes in a liquid crystal display device. For example, a cellulose ester film is used as a polarizing plate protective film in a liquid crystal display device since adhesiveness to polyvinyl alcohol used in a polarizer may be easily secured In recent years, a liquid crystal display device, particularly a liquid crystal display device for a middle sized or small sized equipment, undergoes drastic reduction in thickness, and thus reduction in thickness of members used therein, particularly reduction in thickness of a polarizing plate protective film (such as a protective film hating a hardcoat layer provided on a surface of a liquid crystal device, a protective film functioning as a retardation film, and an ordinary protective film having a small retardation), is being demanded. A middle sized or small sized liquid crystal display device is often exposed to severe environmental changes, for example, in outdoors, and the durability thereof under a high temperature and high humidity environment is an important capability. The progress of reduction in thickness of the polarizing plate protective film may increase the polarizer protecting function demanded per unit thickness, and thus there is more than ever a demand of a thin optical film that is capable of ensuring the durability of the polarizer under a high temperature and high humidity environment.

As a film used in a liquid crystal display device, for example, Patent Reference 1 describes that a cellulose acylate film containing a polyester polymer containing a polyester component, which is derived from a diol containing an alicyclic structure and a dicarboxylic acid derivative having an alicyclic structure, and cellulose acylate has a high tear strength.

Patent Reference 2 describes that a cellulose ester film containing an ester plasticizer having benzene carboxylic acid or phenol residual groups at both terminals thereof and having an alicyclic glycol and an alicyclic dibasic acid has an increased durability of the optical capability against humidity change.

Patent Reference 3 describes that a polyester resin modifier having cyclohexane rings or cyclohexene rings in the main chain skeleton thereof, in which the rings form a polymer through ester bonds at the 1-position and the 2-position of the ring, may enhance the moisture permeability resistance of a cellulose ester film and may suppress fluctuation of the retardation in the thickness direction Rth thereof due to humidity fluctuation.

Patent Reference 4 describes that a resin film containing a resin and an organic acid having a particular structure in an amount of from 0.1 to 20% by mass based on the resin may be improved in peeling property of the film from a metal support in the production of the resin film by solution film formation, and may also improve durability of a polarizer. Patent Reference 4 also describes that the resin film preferably contains a polycondensation polymer, such as a polyester polymer, from the standpoint of the reduction of haze, and describes 1,4-cyclohexanedicarboxylic acid as an example of the aliphatic dicarboxylic acid as a raw material monomer for synthesizing the polyester polymer.

PATENT REFERENCES

Patent Reference 1: JP-A-2004-292696
Patent Reference 2: JP-A-2007-84692
Patent Reference 3: WO 2014/027594
Patent Reference 4: JP-A-2012-72348

SUMMARY OF INVENTION

An optical film used in an IPS liquid crystal display device preferably has a low retardation, but it has been found that the films described in Patent References 1 and 2 exhibit a high retardation and considerably deteriorate the display performance of an IPS liquid crystal display device using the films.

It has been found that the film described in Patent Reference 3 has a low retardation and provides excellent display performance for an IPS liquid crystal display device, but is still insufficient in the durability of the polarizer under a high temperature and high humidity environment.

It has been found that the film described in Patent Reference 4 exhibits a high retardation, considerably deteriorate the display performance of an IPS liquid crystal display device using the films, and is still insufficient in the durability of the polarizer under a high temperature and high humidity environment.

A problem to be solved by the invention is to provide an optical film that achieves a thin film thickness, and is capable of achieving simultaneously both optical characteristics with a low retardation and high durability of a polarizer under a high temperature and high humidity environment on application to a polarizing plate.

The comparison between Examples and Comparative Example 12 of Patent Reference 3 reveals a tendency that a polyester resin modifier having a main chain skeleton polymerized through ester bonds at the 1-position and the 2-position of the cyclohexane rings may suppress fluctuation of Rth due to humidity fluctuation, rather than a polyester resin modifier having a main chain skeleton polymerized through ester bonds at the 1-position and the 4-position of the cyclohexane rings.

Under the circumstances, the present inventors have made earnest investigations for solving the problem, but even though some kinds of the polyester having a main chain skeleton polymerized through ester bonds at the 1-position and the 2-position of the cyclohexane rings described in Patent Reference 3 are studied, they are not successful in large enhancement of the durability of a polarizer. Accordingly, it has been found that there is no such significant relationship between the suppression of fluctuation of Rth due to humidity fluctuation and the high durability of the polarizer under a high temperature and high humidity environment. On the other hand, it has been found that a polyester resin modifier having a main chain skeleton polymerized through ester bonds at the 1-position and the 2-position of the cyclohexane rings has high durability of the polarizer under a high temperature and high humidity environment, rather than a polyester resin modifier having a main chain skeleton polymerized through ester bonds at the 1-position and the 4-position of the cyclohexane rings, such as the polyester derived from 1,4-cyclohexanedicarboxylic acid exemplified in Patent Reference 4.

Thus, the inventors have investigated polyesters polymerized through ester bonds at the 1-position and the 2-position of the cyclohexane rings other than the polyesters described in Patent Reference 3, and as a result, it has been found that an optical film capable of solving the problem may be obtained by using a cellulose ester in combination with at least one kind of polyester containing a repeating unit represented by the following formula 1A and having a blocked terminal, and a durability improving agent for a polarizer.

The invention which is means for solving the above problems includes the followings:

[1] An optical film containing:
a cellulose ester,
a polyester having a recurring unit represented by the formula 1A below and having a blocked terminal, and
a durability improving agent for a polarizer, wherein:
the optical film has a thickness of from 10 to 45 μm,
the optical film has an in-plane retardation, Re, of from −5 to 5 nm at a wavelength of 590 nm under an environment of 25° C. and a relative humidity of 60%, and
the optical film has a retardation in thickness direction, Rth, of from −5 to 5 nm at a wavelength of 590 nm under an atmosphere at 25° C. and a relative humidity of 60%:

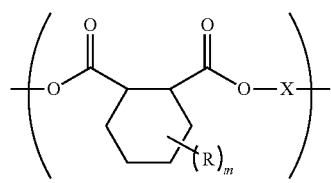

Formula 1A wherein X represents an acyclic divalent linking group having from 2 to 10 carbon atoms,
R represents an alkyl group having from 1 to 8 carbon atoms, an alkenyl group having from 2 to 8 carbon atoms, an alkynyl group having from 2 to 8 carbon atoms, or an aryl group having 6 carbon atoms, R may form a cyclic structure and may have a substituent; the above numbers of carbon atoms do not include the number of carbon atoms in a substituent the group represented by R may further have; and
m represents an integer of from 0 to 4.

[2] The optical film of [1] wherein the polyester has a number average molecular weight, Mn, of from 500 to 3000.
[3] The optical film of [1] wherein the terminal of the polyester is blocked with an acyl group.
[4] The optical film of [3] wherein the acyl group is a linear or branched aliphatic acyl group or an alicyclic acyl group having 4 to 12 carbon atoms.
[5] The optical film of [1] wherein the polyester is contained in an amount of from 5 to 20% by mass based on the amount of the cellulose ester.
[6] A polarizing plate containing a polarizer and at least one sheet of the optical film of [1].
[7] A liquid crystal display device containing a liquid crystal cell and two polarizing plates disposed on both sides of the liquid crystal cell, wherein at least one of the polarizing plates is the polarizing plate of [6].
[8] The liquid crystal display device of [7], wherein the liquid crystal cell is an in-plane switching IPS mode liquid crystal cell.
[9] The liquid crystal display device of [7], wherein the optical film of [1] is disposed between the polarizer and the liquid crystal cell.

The invention can provide an optical film that achieves a thin film thickness, and is capable of achieving simultaneously both optical characteristics with a low retardation and high durability of a polarizer under a high temperature and high humidity environment on application to a polarizing plate as a polarizing plate protective film.

The invention can provide a polarizing plate and liquid crystal display device using the optical film.

DESCRIPTION OF EMBODIMENTS

The invention will be described in detail with reference to embodiments below. While the constitutional elements of the invention may be described with reference to the embodiments, the invention is not limited to the embodiments. In the description, the expression for numeral ranges "from A to B" means that the values A and B are included in the range as the lower and upper limits respectively, and the expression for numeral ranges "A or more" or "A or less" means that the value A is included in the range as the lower or upper limit respectively.

[Optical Film]

The optical film of the invention contains a cellulose ester and a polyester having a recurring unit represented by the formula 1A below and having a blocked terminal, and a durability improving agent for a polarizer. The optical film has a thickness of from 10 to 45 μm. The optical film has an in-plane retardation (Re) of from −5 to 5 nm at a wavelength of 590 nm under an environment of 25° C. and 60% RH, and a retardation in thickness direction (Rth) of from −5 to 5 nm at a wavelength of 590 nm under an atmosphere at 25° C. and 60% RH.

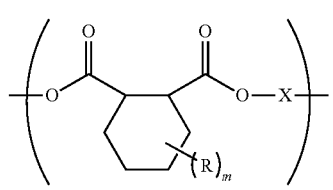

Formula 1A

In the formula 1A, X represents an acyclic divalent linking group having from 2 to 10 carbon atoms. R represents an alkyl group having from 1 to 8 carbon atoms, an alkenyl group having from 2 to 8 carbon atoms, an alkynyl group having from 2 to 8 carbon atoms, or an aryl group having 6 carbon atoms, R may form a cyclic structure and may have a substituent; the above numbers of carbon atoms do not include the number of carbon atoms in a substituent the group represented by R may further have. m represents an integer of from 0 to 4.

The optical film of the invention having the above components achieves a thin film thickness, and is capable of achieving simultaneously both optical characteristics with a low retardation and high durability of a polarizer under a high temperature and high humidity environment on application to a polarizing plate as a polarizing plate protective film.

Preferable embodiments of the optical film of the invention will be described below:

Cellulose Ester

The optical film of the invention contains a cellulose ester. The optical film of the invention preferably contains one or more kinds of a cellulose ester as a major component. Examples of the cellulose ester include a cellulose ester compound and a compound having an ester-substituted cellulose structure obtained by introducing biologically or chemically a functional group to cellulose as a raw material. The term "major component" herein means, in the case where only one kind of a polymer is contained, the polymer, and in the case where two or more kinds of polymers are contained, the polymer that has the largest mass fraction.

The cellulose ester is an ester of cellulose and an acid. The acid constituting the ester is preferably an organic acid, more preferably a carboxylic acid, further preferably a fatty acid having from 2 to 22 carbon atoms, and most preferably a lower fatty acid having from 2 to 4 carbon atoms, forming cellulose acylate.

Examples of cellulose as a raw material of the cellulose acylate include cotton linter and wood pulp (such as hardwood pulp and softwood pulp), and all kinds of cellulose obtained therefrom may be used and may be used after mixing plural kinds thereof depending on necessity. For the cellulose as a raw material, reference may be made, for example, to "Plastic Zairyo Koza (17) Senisokei Jushi" (Lectures on Plastic Materials (17) Cellulose Resins), by Marusawa and Uda, published by Nikkan Kogyo Shimbun, Ltd., 1970, and JIII Journal of Technical Disclosure Monthly, 2001-1745 (pp. 7-8), and all kinds of cellulose described therein may be used.

The cellulose acylate used in the embodiment is obtained by substituting a hydrogen atom of a hydroxyl group of cellulose by an acyl group. The acyl group preferably has from 2 to 22 carbon atoms. The acyl group may be an aliphatic acyl group or an aromatic acyl group, and the cellulose may be substituted by one kind of an acyl group or by plural kinds of acyl groups. Specific examples of the cellulose acylate include an alkylcarbonyl ester, an alkenylcarbonyl ester, an aromatic carbonyl ester and an aromatic alkylcarbonyl ester of cellulose. The alkyl moiety, the alkenyl moiety, the aromatic moiety and the aromatic alkyl moiety may further have a substituent. Preferred examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, i-butanoyl, t-butanoyl, cyclohexanecarbonyl, oleoyl, benzoyl, naphthylcarbonyl and cinnamoyl groups. Among these, acetyl, propionyl, butanoyl, dodecanoyl, octadecanoyl, t-butanoyl, oleoyl, benzoyl, naphthylcarbonyl, cinnamoyl and the like are preferred, acetyl, propionyl and butanoyl are more preferred, and acetyl is most preferred.

The acylation degree of the cellulose acylate used is not particularly limited, and the cellulose acylate that has an acylation degree of from 2.00 to 2.95 is preferably used from the standpoint of the film forming property and the various characteristics of the film thus produced. The acylation degree may be obtained by measuring the ratio of a fatty acid, such as acetic acid, bonded to the cellulose, from which the acylation degree may be calculated. The acylation degree may be measured according to ASTM D-817-91.

In an example of the cellulose acylate having two or more kinds of an acyl groups selected from an acetyl group, a propionyl group and a butanoyl group, the total acylation degree is preferably from 2.50 to 2.95, more preferably from 2.60 to 2.95, and further preferably from 2.65 to 2.95.

In an example of the cellulose acylate having only an acetyl group, i.e., cellulose acetate, the total acetylation degree is preferably from 2.00 to 2.95, more preferably from 2.40 to 2.95, and further preferably from 2.85 to 2.95.

The polymerization degree of the cellulose acylate that is preferably used in the embodiment is preferably from 180 to 700 in terms of viscosity average polymerization degree, and for cellulose acetate, the polymerization degree thereof is more preferably from 180 to 550, further preferably from 180 to 400, and particularly preferably from 180 to 350, in terms of viscosity average polymerization degree. When the polymerization degree is not more than the upper limit, the dope solution of the cellulose acylate may not have a too high viscosity, and a film may be readily produced by casting. When the polymerization degree is not less than the lower limit, problems including a too low strength of the film may be avoided. The viscosity average polymerization degree may be measured by the limiting viscosity method by Uda, et al. (see K. Uda and H. Saito, Journal of the Society of Fiber Science and Technology, Japan, vol. 18, No. 1, pp. 105-120 (1962)). The measurement method is also described in detail in JP-A-9-95538.

The molecular weight distribution of the cellulose acylate that is preferably used in the embodiment may be evaluated by gel permeation chromatography, and the polydispersion index Mw/Mn (wherein Mw represents the weight average molecular weight, and Mn represents the number average molecular weight) thereof is preferably small, i.e., the molecular weight distribution is preferably narrow. Specifically, the value of Mw/Mn is preferably from 1.0 to 4.0, more preferably from 2.0 to 4.0, and further preferably from 2.3 to 3.4.

Polyester

The polyester used in the invention will be described below.

The polyester used in the invention has a recurring unit represented by the following formula 1A and has a blocked terminal.

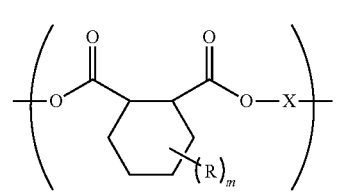

Formula 1A

In the formula 1A, X represents an acyclic divalent linking group having from 2 to 10 carbon atoms. R represents an alkyl group having from 1 to 8 carbon atoms, an alkenyl group having from 2 to 8 carbon atoms, an alkynyl group having from 2 to 8 carbon atoms, or an aryl group having 6 carbon atoms, R may form a cyclic structure and may have a substituent. The above numbers of carbon atoms do not include the number of carbon atoms in a substituent the group represented by R may further have. m represents an integer of from 0 to 4.

The polyesters having a recurring unit containing an alicyclic structure can reduce an in-plane retardation (Re) at a wavelength of 590 nm under an environment of 25° C. and 60% RH, and a retardation in thickness direction (Rth) at a wavelength of 590 nm under an atmosphere at 25° C. and 60% RH more than polyesters having a recurring unit containing an aromatic ring structure.

It is preferable that the high rigidity and low retardation of the film are both achieved by increasing the content of the rigid alicyclic structure in the polyester having the above structure.

In the formula 1A, X represents an acyclic divalent linking group having from 2 to 10 carbon atoms, preferably an acyclic divalent linking group having from 2 to 6 carbon atoms, and more preferably an acyclic divalent linking group having from 2 to 4.

Examples of the acyclic divalent linking group having from 2 to 10 carbon atoms include an alkylene group (preferably having from 2 to 10 carbon atoms, more preferably from 2 to 6 carbon atoms, and particularly preferably from 2 to 4 carbon atoms) and an alkynylene group (preferably having from 2 to 10 carbon atoms, more preferably from 2 to 6 carbon atoms, and particularly preferably from 2 to 4 carbon atoms), and a linking group containing an atom other than carbon, such as an oxygen atom and a nitrogen atom, in an alkylene group or an alkynylene group.

The divalent linking group having from 2 to 10 carbon atoms may have a substituent, and examples of the substituent include an alkyl group, an alkoxy group, a hydroxyl group, an alkoxy-substituted alkyl group and a carboxyl group.

The term "acyclic" herein means one that does not contain a cyclic structure, examples of a group that does not contain a cyclic structure include a linear group and a branched group.

In the formula 1A, R represents an alkyl group having from 1 to 8 carbon atoms, an alkenyl group having from 2 to 8 carbon atoms, an alkynyl group having from 2 to 8 carbon atoms or an aryl group having 6 carbon atoms, may form a cyclic structure, and may have a substituent. The above numbers of carbon atoms do not include the number of carbon atoms in a substituent the group represented by R may further have. Examples of the alkyl group having from 1 to 8 carbon atoms include a methyl group, an ethyl group, a propyl group, a butyl group, an isobutyl group, a pentyl group, a hexyl group, an octyl group and a 2-ethylhexyl group, and an alkyl group having from 1 to 4 carbon atoms is preferred, and a methyl group and an ethyl group are more preferred. Examples of the alkenyl group having from 2 to 8 carbon atoms include an ethenyl group, a 1-methylethenyl group, a 1-propenyl group, a 2-propenyl group, a 2-methyl-1-propenyl group, 2-methyl-2-propenyl group and a 2-methylenebutyl group. Examples of the alkynyl group having from 2 to 8 carbon atoms include an ethynyl group, a 1-methylethynyl group, a 1-propynyl group, a 2-propynyl group, a 2-methyl-1-propynyl group, a 2-methyl-2-propynyl group and a 2-methylenebutynyl group. Examples of the aryl group having 6 carbon atoms include a phenyl group and a 4-methylphenyl group. R may form a cyclic structure, and examples of the cyclic structure include a cyclohexyl group, a cyclooctyl group, a bornyl group, an isobornyl group and a norbornyl group. R may have a substituent, and examples of the substituent include an alkyl group, an alkoxy group, a hydroxyl group, an alkoxy-substituted alkyl group and a carboxyl group, and an alkyl group is preferred, and a methyl group and an ethyl group are more preferred. The above numbers of carbon atoms do not include the number of carbon atoms in a substituent the group represented by R may further have. For example, a methyl-substituted phenyl group is a phenyl group having 6 carbon atoms substituted with a methyl group, not a phenyl group having 7 carbon atoms.

In the formula 1A, m represents an integer of from 0 to 4, preferably an integer of from 1 to 4, and more preferably an integer of from 1 to 2, and is particularly preferably 1 from the standpoint of the availability of the raw material. With m in a range of from 1 to 4, the equivalent effect of improving the durability of the polarizer may be obtained under a high temperature and high humidity environment. In this case, R is preferably substituted at the 4-position of the cyclohexyl ring contained in the repeating unit represented by the formula 1A, from the standpoint of the reactivity and the availability of the raw material.

The polyester used in the invention is preferably synthesized from an acyclic aliphatic diol having from 2 to 10 carbon atoms and a dicarboxylic acid represented by the formula 2A below (dicarboxylic acid may be referred to as dibasic acid). As the synthesis method, known methods may be employed, such as dehydration condensation reaction of a dicarboxylic acid and a diol, addition and dehydration condensation reaction of a dicarboxylic acid anhydride to glycol.

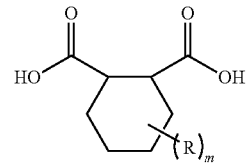

Formula 2A

In the formula 2A, R represents an alkyl group having from 1 to 8 carbon atoms, an alkenyl group having from 2 to 8 carbon atoms, an alkynyl group having from 2 to 8 carbon atoms, or an aryl group having 6 carbon atoms, R may form a cyclic structure and may have a substituent. The above numbers of carbon atoms do not include the number of carbon atoms in a substituent the group represented by R may further have. m represents an integer of from 0 to 4.

A dicarboxylic acid and a diol that are preferably used for synthesis of the polyester used in the invention will be described below.

Dicarboxylic Acid

As the dicarboxylic acid, at least a dicarboxylic acid represented by the formula 2A is preferably used.

The preferred ranges of R and m in the formula 2A are the same as the preferred ranges of R and m in the formula 1A.

Specific examples of the dicarboxylic acid represented by the formula 2A include 1,2-cyclohexyldicarboxylic acid, 3-methyl-1,2-cyclohexyldicarboxylic acid, 4-methyl-1,2-cyclohexyldicarboxylic acid, 4-ethyl-1,2-cyclohexyldicarboxylic acid, 4,5-dimethyl-1,2-cyclohexyldicarboxylic acid, 4-isobornyl-1,2-cyclohexyldicarboxylic acid and 4-phenyl-1,2-cyclohexyldicarboxylic acid. Among these, 1,2-cyclohexyldicarboxylic acid and 4-methyl-1,2-cyclohexyldicarboxylic acid are preferred from the standpoint of the availability.

Dicarboxylic Acid

Aliphatic dicarboxylic acid not included in the formula 2A may be used as the dicarboxylic acid. Polyesters used in the invention may have a recurring unit not included in the formula 1A as a structural unit within the range not deteriorating the effect of the invention in addition to the recurring unit represented by the formula 1A. Examples of the aliphatic dicarboxylic acid having a 3- to 6-membered alicyclic structure include 1,4-cyclohexanedicarboxylic acid, 3-methyl-1,4-cyclohexanedicarboxylic acid, cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cycohexanedicarboxylic acid and 1,4-cyclohexanedicarboxylic acid. Among these, 1,2-cyclohexanedicarboxylic acid and 4-methyl-1,2-cyclohexanedicarboxylic acid are preferred, and 1,2-cyclohexanedicarboxylic acid is particularly preferred.

Examples of the acyclic aliphatic dicarboxylic acid include oxalic acid, malonic acid, succinic acid, maleic acid, fumaric acid, glutaric acid, adipic acid, suberic acid, azelaic acid, cyclohexanedicarboxylic acid and sebacic acid. Among these, succinic acid and adipic acid are preferred, and adipic acid is particularly preferred.

The dicarboxylic acid used in the embodiment preferably has from 3 to 12 carbon atoms, and more preferably from 4 to 8 carbon atoms. A mixture of two or more kinds of dicarboxylic acids may be used in the embodiment, and in this case, the average value of the number of carbon atoms of the two or more kinds of the dicarboxylic acids is preferably in the aforementioned range. When the number of carbon atoms of the dicarboxylic acid is in the range, the polyester may have high compatibility with the cellulose acylate, and the resulting optical film may be prevented from undergoing bleed out of the polyester in the production of the film and on stretching the film at a high temperature.

An acyclic aliphatic dicarboxylic acid and an aliphatic carboxylic acid having an alicyclic structure may be used in combination. Specific examples of the combination thereof include a combination of adipic acid and 1,2-cyclohexanedicarboxylic acid, and a combination of adipic acid and 4-methyl-1,2-cyclohexanedicarboxylic acid.

In the case where an acyclic aliphatic dicarboxylic acid and an aliphatic carboxylic acid having an alicyclic structure are used in combination, the molar ratio thereof m/n (wherein m represents the molar fraction of the repeating unit derived from the acyclic aliphatic dicarboxylic acid, and n represents the repeating unit derived from the aliphatic carboxylic acid having an alicyclic structure) is preferably from 0/10 to 3/7, and more preferably from 0/10 to 1/9 from the standpoint of durability of polarizer.

Diol

Acyclic (aliphatic) diol having from 2 to 10 carbon atoms is used as a diol.

Examples of the acyclic aliphatic diol include an alkanediol, specific examples of which include ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpropane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and diethylene glycol.

The aliphatic diol is preferably at least one kind of ethylene glycol, 1,2-propanediol and 1,3-propanediol, more preferably at least one kind of ethylene glycol and 1,2-propanediol, and particularly preferably ethylene glycol from the standpoint of the compatibility with the cellulose. In the case where two kinds of aliphatic diols are used, ethylene glycol and 1,2-propanediol are preferably used.

The number of carbon atoms contained in the acyclic aliphatic diol is from 2 to 10, more preferably from 2 to 6, and particularly preferably from 2 to 4. In the case where two or more kinds of the glycols are used, the average value of the number of carbon atoms of the two or more kinds of glycols is preferably in the aforementioned range. When the number of carbon atoms of the glycol is in the range, the polyester may have high compatibility with the cellulose acylate, and the resulting optical film may be prevented from undergoing bleed out of the polyester in the production of the film and on stretching the film at a high temperature.

Aliphatic diol having an alicyclic structure may be used. Examples of the diol include 1,2-cyclohexanediol, 1,2-cyclohexanedimethanol, 1,4-cyclohexanediol and 1,4-cyclohexanedimethanol.

Terminal Structure

The polyester used in the invention is a polyester having a blocked terminal. As the polyester, such a polyester is preferred that a terminal thereof has a terminal structure that is obtained through reaction with a monoalcohol (or a compound that is a derivative of a monoalcohol and is capable of forming an ester bond to the terminal carboxyl group of the polyester) or a monocarboxylic acid (or a compound that is a derivative of a monocarboxylic acid and is capable of forming an ester bond to the terminal hydroxyl group of the polyester). For example, in the case where a polyester having a terminal carboxyl group is obtained through reaction of a dibasic acid and a diol, the terminal thereof may be blocked with a monoalcohol residual group through reaction of the polyester with a monoalcohol. In the case where a polyester having a terminal hydroxyl group is obtained, the terminal thereof may be blocked with a monocarboxylic acid residual group through reaction of the polyester with a monocarboxylic acid. The blocking of the terminal with a hydrophobic functional group is effective for improvement of the durability of the polarizer of the polarizing plate under a high temperature and high humidity environment, and this may be caused by the function of delaying hydrolysis of the ester group.

The residual group referred herein is a partial structure of the polyester and shows a partial structure of the monomer constituting the polyester. For example, a monocarboxylic acid residual group formed with a monocarboxylic acid R—COOH is represented by R—CO—, and a monoalcohol residual group formed with a monoalcohol R—OH is represented by R—O—.

In the optical film of the invention, the terminal of the polyester is preferably blocked with an acyl group, and more preferably has a terminal structure obtained through reaction with a monocarboxylic acid. In this case, the terminal structure blocked with an acyl group (the terminal structure obtained through reaction with a monocarboxylic acid) may be either a terminal structure, in which the hydrogen atom of the hydroxyl group is substituted by an acyl group derived from a linear or branched aliphatic monocarboxylic acid (which means an aliphatic monocarboxylic acid that has no alicyclic structure, and preferably does also not contain an aromatic ring nor a heterocyclic ring as a substituent), or a terminal structure, in which the hydrogen atom of the hydroxyl group is substituted by an acyl group derived from a monocarboxylic acid having an alicyclic structure.

In the optical film of the invention, the acyl group is preferably a linear or branched aliphatic acyl group having from 2 to 4 carbon atoms or an alicyclic acyl group having from 4 to 12 carbon atoms, more preferably a linear or branched aliphatic acyl group having from 2 to 3 carbon atoms or an alicyclic acyl group having from 4 to 7 carbon atoms, and further preferably a linear or branched aliphatic acyl group having 2 carbon atoms or an alicyclic acyl group having 7 carbon atoms. Therefore, the monocarboxylic acid is preferably a linear or branched aliphatic monocarboxylic acid having from 2 to 4 carbon atoms or a cycloalkylmonocarboxylic acid having from 4 to 12 carbon atoms, more preferably a linear or branched aliphatic monocarboxylic acid having from 2 to 3 carbon atoms or a cycloalkylmonocarboxylic acid having from 4 to 7 carbon atoms, and further preferably an aliphatic monocarboxylic acid having 2 carbon atoms or a cycloalkylmonocarboxylic acid having 7 carbon atoms. Examples of the linear or branched aliphatic monocarboxylic acid include acetic acid, propionic acid, butanoic acid, and derivatives thereof, and acetic acid and propionic acid are preferred, and acetic acid (which provides an acetyl group as the terminal) is more preferred.

In the optical film of the invention, it is also preferred that the terminal of the polyester has a terminal structure that has an ester bond formed by substituting a part of the carboxyl group with a group derived from a monoalcohol having an alicyclic structure (which may be hereinafter referred to as a monoalcohol residual group) (the terminal structure may be hereinafter referred to as a blocked hydrogen atom of the terminal hydroxyl group), and it is also preferred that the terminal of the polyester has a terminal structure having the hydrogen atom of the hydroxyl group that is substituted by an acyl group derived from a monocarboxylic acid having an alicyclic structure (the terminal structure may be hereinafter referred to as a blocked hydrogen atom of the terminal hydroxyl group). Among these, it is more preferred that the terminal of the polyester has a terminal structure having the hydrogen atom of the hydroxyl group that is substituted by an acyl group derived from a monocarboxylic acid having an alicyclic structure.

The monoalcohol having an alicyclic structure is preferably a monoalcohol having an alicyclic structure having from 4 to 12 carbon atoms, more preferably a cycloalkyl monoalcohol having from 4 to 12 carbon atoms, and particularly preferably a cycloalkyl monoalcohol having from 6 to 12 carbon atoms. The monoalcohol having an alicyclic structure is further particularly preferably a cycloalkyl monoalcohol having from 6 to 12 carbon atoms, in which the cycloalkyl monoalcohol having from 6 to 12 carbon atoms contains at least one cyclohexyl ring. Specific examples thereof include cyclohexanol, 2-methylcyclohexanol, 3-methylcyclohexanol, 4-methylcyclohexanol, 2-ethylcyclohexanol, 4-ethylcyclohexanol, 4-isopropylcyclohexanol, 4-butylcyclohexanol, 4-tert-butylcyclohexanol, 2,5-dimethylcyclohexanol, 3,5-dimethylcyclohexanol, 4-cyclohexylcyclohexanol, cycloheptanol, cyclooctanol, cyclododecanol, cyclohexanemethanol, norborneol, 1-adamantanol and 2-adamantanol.

The monocarboxylic acid having an alicyclic structure is preferably a monocarboxylic acid having from 4 to 12 carbon atoms having an alicyclic structure, more preferably a cycloalkylmonocarboxylic acid having from 4 to 12 carbon atoms, and particularly preferably a cycloalkylmonocarboxylic acid having from 6 to 12 carbon atoms. The monocarboxylic acid having an alicyclic structure is further particularly preferably a cycloalkylmonocarboxylic acid having from 6 to 12 carbon atoms, in which the cycloalkylmonocarboxylic acid having from 6 to 12 carbon atoms contains at least one cyclohexyl ring. Specific examples thereof include cyclopropanecarboxylic acid, cyclobutanecarboxylic acid, cyclopentanecarboxylic acid, cyclohexanecarboxylic acid, 4-methylcyclohexanecarboxylic acid, 4-ethylcyclohexanecarboxylic acid, 4-propylcyclohexanecarboxylic acid and 4-tert-butylcyclohexanecarboxylic acid. Among these, cyclohexanecarboxylic acid and 4-methylcyclohexanecarboxylic acid are particularly preferred, and cyclohexanecarboxylic acid is further particularly preferred. The cycloalkylmonocarboxylic acid having from 6 to 12 carbon atoms, in which the cycloalkylmonocarboxylic acid having from 6 to 12 carbon atoms contains at least one cyclohexyl ring, includes a cycloalkylmonocarboxylic acid having from 6 to 12 carbon atoms and the like that each contain a condensed ring formed of the substituents on the cyclohexyl ring that are bonded to each other.

The monoalcohol and the monocarboxylic acid used for blocking may be a mixture of two or more kinds thereof. In this case, the both terminals of the polyester are preferably monoalcohol residual groups or monocarboxylic acid residual groups. The polyester having a blocked terminal is not liable to be a solid matter at ordinary temperature to have good handleability, and may provide an optical film that is excellent in the humidity stability and the durability of the polarizer of the polarizing plate. The blocking of the terminal with a functional group that is hydrophobic and has a bulky alicyclic structure is effective for improvement of the durability of the polarizer of the polarizing plate under a high temperature and high humidity environment, and also may improve the stiffness of the film.

The polyester preferably has a hydroxyl group value of 10 mgKOH/g or less, more preferably 5 mgKOH/g or less, and particularly preferably 1 mgKOH/g or less, from the standpoint of the enhancement of the polarizer durability under a high temperature and high humidity environment.

Synthesis Method

The polyester may be readily synthesized by a thermal melting condensation method with polyesterification reaction or ester exchange reaction of the dicarboxylic acid, the diol and a monoalcohol or a monocarboxylic acid for terminal blocking, or an interface condensation method of an acid chloride of the acid and the glycol.

The number average molecular weight (Mn) of the polyester in the embodiment is preferably from 500 to 3,000, more preferably from 600 to 1,500, and further preferably from 700 to 1,200. When the number average molecular weight of the polyester is 500 or more, the polyester may have low volatility, and the resulting optical film may be prevented from undergoing malfunction and process contamination due to volatilization thereof under a high temperature condition on stretching the optical film. When the number average molecular weight thereof is 3,000 or less, the polyester may have high compatibility with the cellulose ester, and the resulting optical film may be prevented from undergoing bleed out of the polyester in the production of the film and on stretching the film at a high temperature.

The number average molecular weight of the polyester used in the invention is measured and evaluated by gel permeation chromatography (GPC). More specifically, the measurement contains dissolving the polyester in tetrahydrofuran and measuring the number average molecular weight with a high speed gel permeation chromatography (GPC) available from Tosoh Corporation. The number average molecular weight (Mn) is calculated in terms of polystyrene.

Addition Amount (Content)

The optical film of the embodiment preferably has a content of the polyester of from 5 to 20% by mass, more preferably from 5 to 18% by mass, and particularly preferably from 5 to 15% by mass, based on the cellulose ester. The polyester may be used solely or as a combination of two or more kinds thereof. In the case where two or more kinds thereof are contained, the total amount thereof is preferably in the aforementioned range.

Ultraviolet Ray Absorbent

The optical film of the invention preferably contains an ultraviolet ray (UV) absorbent in addition to the cellulose ester. The UV absorbent contributes to improvement of the polarizer durability under a high temperature and high humidity environment. In particular, the addition of the UV absorbent is effective in the case where the optical film of the invention is used as a polarizing plate protective film which protects a polarizer in the polarizing plate or as a surface protective film of a liquid crystal display device.

The UV absorbent that may be used in the embodiment is not particularly limited, and any UV absorbent that has been used in a cellulose acylate film may be used. Examples of the UV absorbent include those described in JP-A-2006-184874. A polymer ultraviolet ray absorbent may also be preferably used, and the polymer ultraviolet ray absorbent described in JP-A-6-148430 may be preferably used.

The amount of the ultraviolet ray absorbent used is not determined unconditionally since the amount may vary depending on the kind of the ultraviolet ray absorbent, the use conditions and the like, and the ultraviolet ray absorbent is preferably contained in an amount of from 1 to 5% by mass based on the cellulose ester.

Examples of the ultraviolet ray absorbent include one having the following structure, but the ultraviolet ray absorbent added is not limited thereto.

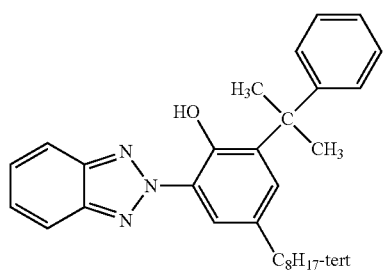

Durability Improving Agent for Polarizer

The optical film of the invention preferably contains a durability improving agent for a polarizer as an additive for improving the durability of the polarizer under a high temperature and high humidity environment.

Specific examples of the durability improving agent for a polarizer include an organic acid represented by the following formula (11) and a compound represented by the following formula (21)

Organic Acid Represented by Formula (11)

In the formula (1), $X^{11}$ represents an acid group wherein the acid dissociation constant is 5.5 or less; L represents a single bond, or a di- or more valent linking group; $R^{11}$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a from 6 to 30 membered heterocyclic group, and each group may have a further substituent; n represents 1 when L is a single bond, or represents the number expressed by:

(the valent number of $L$)−1 when L is a di- or more valent linking group.

The organic acid of the formula (11) is preferably a partial derivative of a polycarboxylic acid. In this description, the partial derivative of a polycarboxylic acid has a structure where one molecule of a fatty acid and a polycarboxylic acid are ester-bonded to one molecule of a polyalcohol, and is a compound having at least one unsubstituted acid group derived from a polycarboxylic acid. In this description, the fatty acid means an aliphatic monocarboxylic acid. Specifically, the fatty acid in this description is not limited to a so-called higher fatty acid but includes a lower fatty acid having at most 12 carbon atoms such as acetic acid, propionic acid, etc.

The partial derivative of a polycarboxylic acid is preferably a partial derivative of a polycarboxylic acid. Above all, the organic acid of formula (11) comprises a structure wherein one molecule of fatty acid and one molecule of poly carboxylic acid are bonding to one molecule of polyalcohol by ester bond, wherein the structure has at least one of unsubstituted carboxyl group derived from the poly carboxylic acid. The polycarboxylic acid for the partial derivative of a polycarboxylic acid is not specifically defined, for which, for example, preferred are succinic acid, citric acid, tartaric acid, diacetyltartaric acid, malic acid, adipic acid.

The polyalcohol for the partial derivative of a polycarboxylic acid includes adonitol, arabitol, ethylene glycol, diethylene glycol, triethylene glycol, tetraethylene glycol, 1,2-propanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, glycerin, etc. In those, preferred are glycerin and so it is preferably that the organic acid represented by formula (11) is a so-called organic acid monoglyceride.

The organic acid of formula (11) for use in the invention is preferably an organic acid glyceride (glycerin fatty acid organic acid ester) in which the acid group $X^{11}$ of the organic acid bonds to the hydrophobic moiety $R^{11}$ via the linking group L containing a glycerin-derived group. The organic acid glyceride in this description is a compound having a structure in which one or two of the three hydroxyl groups of glycerin form an ester bond with a fatty acid and the remaining one or two hydroxyl groups form an ester bond with a polycarboxylic acid and which has an acid group derived from the polycarboxylic acid.

Above all, more preferred is an organic acid monoglyceride or an organic acid diglyceride, and even more preferred is an organic acid monoglyceride. The organic acid monoglyceride in this description is a compound having a structure in which one of the three hydroxyl groups of glycerin forms an ester bond with a fatty acid and the remaining one or two hydroxyl groups form an ester bond with a polycarboxylic acid and which has an acid group derived from the polycarboxylic acid. The organic acid diglyceride in this description is a compound having a structure in which two of the three hydroxyl groups of glycerin form an ester bond with a fatty acid and the remaining one hydroxyl group forms an ester bond with a polycarboxylic acid and which has an acid group derived from the polycarboxylic acid.

Of the organic monoglyceride, more preferred is one having a structure in which one of the three hydroxyl groups of glycerin forms an ester bond with a fatty acid and the remaining one hydroxyl group is an unsubstituted hydroxyl group and the last one hydroxyl group forms an ester bond with a polycarboxylic acid and which has an acid group derived from the polycarboxylic acid. Preferably, the hydroxyl group ester-bonding to the fatty acid in the organic acid monoglyceride is in an asymmetric position (so-called α-monoglyceride position), and the hydroxyl group ester-bonding to the polyorganic acid in the organic acid monoglyceride is similarly in an asymmetric position (so-called α-monoglyceride position). Specifically, of the above-mentioned organic monoglyceride, preferred is one having a structure which has an unsubstituted hydroxyl group and in which the carbon atom directly bonding to the hydroxyl group that ester-bonds to the fatty acid and the carbon atom directly bonding to the hydroxyl group that ester-bonds to the polycarboxylic acid do not lie next to each other.

Of the above-mentioned organic monoglyceride, especially preferred is a polycarboxylic acid monoglyceride. The polycarboxylic acid monoglyceride has at least one unsubstituted carboxyl group of the polycarboxylic acid moiety and the other carboxyl groups are substituted with a monoglyceride. More preferred is a carboxyl group-having organic acid monoglyceride in which one fatty acid molecule and one polyvalent carboxylic acid molecule bond to one glycerin molecule.

The polycarboxylic acid for the monoglyceride of a polycarboxylic acid is not specifically defined, for which, for example, preferred are succinic acid, citric acid, tartaric acid, diacetyltartaric acid, malic acid, adipic acid.

The fatty acid for the monoglyceride of a polycarboxylic acid is not specifically defined, for which is preferred a saturated or unsaturated fatty acid having from 8 to 22 carbon atoms. Concretely mentioned are caprylic acid, capric acid, lauric acid, myristic acid, palmitic acid, stearic acid, behenic acid, oleic acid, etc.

The carboxyl group-having organic acid monoglyceride usable in the invention as a durability improving agent for a polarizer will be described in detail below.

The carboxyl group-having organic acid monoglyceride usable in the invention as a durability improving agent for a polarizer may be obtained by reacting a polyorganic acid anhydride and a fatty acid monoglyceride generally according to the method described in JP-A 4-218597 and Japanese Patent No. 3823524.

The reaction is attained generally in the absence of a solvent, and for example, the reaction of succinic acid and a fatty acid monoglyceride having 18 carbon atoms may be attained at a temperature of around 120° C. and may be completed within about 90 minutes. Thus obtained, the organic acid monoglyceride is generally a mixture containing an organic acid, unreacted monoglyceride and diglyceride and other oligomers. In the invention, the mixture may be used directly as it is.

For increasing the purity of the carboxyl group-having organic acid monoglyceride, the carboxyl group-having organic acid monoglyceride may be isolated from the mixture through distillation or the like. The carboxyl group-having organic acid monoglyceride having a high purity is commercially available as a distilled monoglyceride, which may be used in the invention. Commercial products of the carboxyl group-having organic acid monoglyceride include, for example, Riken Vitamin's Poem K-37V (citric and oleic acid esters of glycerol), Kao's Step SS (succinic acid monoglyceride in which stearic acid/palmitic acid monoglyceride bonds to succinic acid), etc.

The optical film of the invention preferably has a content of the organic acid represented by the formula (11) of from 0.1 to 15% by mass, more preferably from 0.2 to 10% by mass, particularly preferably from 0.3 to 5% by mass, and further particularly preferably from 1.5 to 5% by mass, based on the cellulose ester.

When the content of the organic acid represented by the formula (11) is 0.1% by mass or more based on the cellulose ester, the improving effect of the durability of a polarizer and the improving effect of the peeling property may be sufficiently obtained. When the content of the organic acid represented by the formula (11) is 20% by mass or less based on the cellulose ester, it is preferred since the organic acid may be difficult to bleed out with the lapse of time under a high temperature and high humidity environment, and the orthogonal transmission of the polarizing plate is difficult to be increased.

In addition to the above, the compounds described in paragraphs [0030] to [0054] of JP-A-2012-72348 are also preferred as the organic acid represented by the formula (11), and the contents in the paragraphs of the literature are incorporated herein by reference.

Compound Represented by Formula (21)

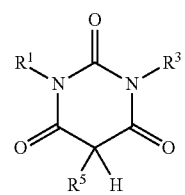

Formula (21)

In the formula (21), each of $R^1$, $R^3$ and $R^5$ independently represents a hydrogen atom, an alkyl group, a cycloalkyl group, an alkenyl group or an aromatic group. The alkyl group, the cycloalkyl group, the alkenyl group and the aromatic group may have a substituent. One of $R^1$, $R^3$ and $R^5$ is an alkyl group or a cycloalkyl group which are substituted with a group having a cyclic structure. The total number of cyclic structures present in $R^1$, $R^3$ and $R^5$ is 3 or more.

The number of the carbon atoms in the alkyl group of $R^1$, $R^3$ and $R^5$ is preferably from 1 to 20, more preferably from 1 to 10, still more preferably from 1 to 5, particularly preferably from 1 to 3. Among them, a methyl group and an ethyl group are preferred. When the alkyl group is substituted with a group having a cyclic structure, the number of the carbon atoms of the alkyl group is preferably from 7 to 20, more preferably from 7 to 12, still more preferably from 7 to 10. The cyclic structure in the alkyl group substituted with a group having a cyclic structure may be an aromatic ring (including aromatic hetero ring) or aliphatic ring. An aromatic hydrocarbon ring and an aliphatic ring are preferred.

The number of the carbon atoms in the cycloalkyl group of $R^1$, $R^3$ and $R^5$ is preferably from 3 to 20, more preferably from 3 to 10, still more preferably from 4 to 8, particularly preferably 5 or 6. The cycloalkyl group is specifically exemplified by a cyclopropyl group, a cyclopentyl group and a cyclohexyl group. A cyclohexyl group is particularly preferred.

The number of the carbon atoms in the alkenyl group of $R^1$, $R^3$ and $R^5$ is preferably from 2 to 20, more preferably from 2 to 10, still more preferably from 2 to 10, particularly preferably 2 to 5. The alkenyl group is specifically exemplified by a vinyl group and an allyl group.

The aromatic group of $R^1$, $R^3$ and $R^5$ may be an aromatic hydrocarbon group or an aromatic heterocyclic group. An aromatic hydrocarbon group is preferred. The number of the aromatic group is preferably from 6 to 20, more preferably from 6 to 16, still more preferably from 6 to 12.

The aromatic group, particularly aromatic hydrocarbon group, is specifically exemplified by a phenyl group and a naphthyl group. A phenyl group is more preferred.

Each of $R^1$, $R^3$ and $R^5$ may have a substituent.

The substituent is not specifically limited, and is exemplified by alkyl group (preferably $C_{1-10}$ ones, such as methyl group, ethyl group, isopropyl group, t-butyl group, pentyl group, heptyl group, 1-ethylpentyl group, benzyl group, 2-ethoxyethyl group, 1-carboxymethyl group, etc.), alkenyl group (preferably $C_{2-20}$ ones, such as vinyl group, allyl group, oleyl group, etc.), alkynyl group (preferably $C_{2-20}$ ones, such as ethynyl group, butadienyl group, phenylethynyl group, etc.), cycloalkyl group (preferably $C_{3-20}$ ones, such as cyclopropyl group, cyclopentyl group, cyclohexyl group, 4-methylcyclohexyl group, etc.), aryl group (preferably $C_{6-26}$ ones, such as phenyl group, 1-naphthyl group, 4-methoxyphenyl group, 2-chlorophenyl group, 3-methylphenyl group, etc.), heterocyclic group (preferably $C_{0-20}$ ones, preferably having oxygen atom, nitrogen atom or sulfur atom as a hetero atom composing the ring, may be 5- or 6-membered ring occasionally condensed with a benzene ring or heterocycle, the constituting rings may be saturated ring, unsaturated ring or aromatic ring, such as 2-pyridyl group, 4-pyridyl group, 2-imidazolyl group, 2-benzoimidazolyl group, 2-thiazolyl group, 2-oxazolyl group, etc.), alkoxy group (preferably $C_{1-20}$ ones, such as methoxy group, ethoxy group, isopropyloxy group, benzyloxy group, etc.), aryloxy group (preferably $C_{6-26}$ ones, such as phenoxy group, 1-naphthyloxy group, 3-methylphenoxy group, 4-methoxyphenoxy group, etc.), alkylthio group (preferably $C_{1-20}$ ones, such as methylthio group, ethylthio group, isopropylthio group, benzylthio group, etc.), arylthio group (preferably $C_{6-26}$ ones, such as phenylthio group, 1-naphthylthio group, 3-methylphenylthio group, 4-methoxyphenylthio group, etc.), sulfonyl group (preferably alkyl or aryl sulfonyl group, preferably $C_{1-20}$ ones, such as methylsulfonyl, ethylsulfonyl, benzenesulfonyl, toluenesulfonyl, etc.), acyl group (containing alkylcarbonyl group, alkenylcarbonyl group, arylcarbonyl group or heterocyclic carbonyl group, preferably $C_{20}$ or shorter, such as acetyl group, pivaloyl group, acryloyl group, methacryloyl group, benzoyl group, nicotinoyl group, etc.), alkoxycarbonyl group (preferably $C_{2-20}$ ones, such as ethoxycarbonyl group, 2-ethylhexyloxycarbonyl group, etc.), aryloxycarbonyl group (preferably $C_{7-20}$ ones, such as phenyloxycarbonyl group, naphthyloxycarbonyl group, etc.), amino group (containing amino group, alkylamino group, arylamino group or heterocyclic amino group, preferably $C_{0-20}$ ones, such as amino group, N,N-dimethylamino group, N,N-diethylamino group, N-ethylamino group, anilino group, 1-pyrrolidinyl group, piperidino group, morphonyl group, etc.), sulfonamide group (preferably alkyl or arylsulfonamide group, preferably $C_{0-20}$ ones, such as N,N-dimethylsulfonamide group, N-phenylsulfonamide group, etc.), sulfamoyl group (preferably alkyl or aryl sulfamoyl group, preferably $C_{0-20}$ ones, such as N,N-dimethylsulfamoyl group, N-phenylsulfamoyl group, etc.), acyloxy group (preferably $C_{1-20}$ ones, such as acetyloxy group, benzoyloxy group, etc.), carbamoyl group (preferably alkyl or aryl carbamoyl group, preferably $C_{1-20}$ ones, such as N,N-dimethylcarbamoyl group, N-phenylcarbamoyl group, etc.), acylamino group (preferably $C_{1-20}$ ones, such as acetylamino group, acryloylamino group, benzoylamino group, nicotinamide group, etc.), cyano group, hydroxyl group, mercapto group, and halogen atom (for example, fluorine atom, chlorine atom, bromine atom, iodine atom, etc.).

The above-described substituents may further have the above-described substituents to form, for example, a perfluoroalkyl group such as a trifluoromethyl group, an aralkyl group, an alkyl group substituted with an acyl group.

The above-described substituents apply not only to the substituents which may be owned by $R^1$, $R^3$ and $R^5$ but also to the substituents which may be owned by the compounds described in this specification.

Among the above-described substituents which may be owned by $R^1$, $R^3$ and $R^5$, preferred are an alkyl group, an aryl group, an alkoxy group, an alkylthio group, an alkylsulfonyl group, a halogen atom and an acyl group. More preferred are an alkyl group, an aryl group, an alkoxy group and an acyl group. Further preferred are an alkyl group and an alkoxy group.

In the compound represented by the formula (21), one of $R^1$, $R^3$ and $R^5$ represents an alkyl group substituted by a group having a cyclic structure, or a cycloalkyl group, and one of them is preferably an alkyl group substituted by a group having a cyclic structure.

Among these, it is preferred that $R^5$ is an alkyl group substituted by a group having a cyclic structure, or a cycloalkyl group.

The ring of the group having a cyclic structure is preferably a benzene ring, a naphthalene ring, a cyclopentane ring, a cyclohexane ring, or a nitrogen-containing heterocyclic ring (such as a pyrrole ring, a pyrazole ring, an imidazole ring, an oxazole ring, a thiazole ring, a pyridine ring, an indole ring and an isoindole ring).

In the compound represented by the formula (21), at least two of $R^1$, $R^3$ and $R^5$ each preferably represent an alkyl group having a cyclic structure as a substituent, or a cycloalkyl group. Furthermore, it is particularly preferred that $R^1$ and $R^3$ each independently represent an alkyl group, which may have a substituent, an aromatic group, which may have a substituent, or a cycloalkyl group.

In the compound represented by the formula (21), the total number of cyclic structures present in the substituents of $R^1$, $R^3$ and $R^5$ is preferably 4 at most.

$R^5$ is preferably an alkyl group, which may be substituted by a group having a cyclic structure or an acyl group, or a cycloalkyl group, more preferably an alkyl group substituted by an aryl group, an alkyl group substituted by an acyl group (preferably an alkyl group substituted by an acyl group and an aryl group), or a cycloalkyl group, and further preferably an alkyl group substituted by an aryl group, or a cycloalkyl group.

The preferred alkyl group and the preferred cycloalkyl group for $R^5$ will be further described below.

Examples of an unsubstituted alkyl group as the alkyl group include methyl, ethyl, propyl, isopropyl, n-butyl, n-hexyl, 2-ethylhexyl and n-octyl.

Examples of the alkyl group substituted by a group having a cyclic structure include an aralkyl group, such as benzyl, phenethyl, 3-phenylpropyl and naphthylmethyl, pyridin-2-ylmethyl, pyridin-3-ylmethyl, pyridin-4-ylmethyl and indol-3-ylmethyl.

The acyl group in the alkyl group substituted by an acyl group is preferably an alkylcarbonyl group, a cycloalkylcarbonyl group or an arylcarbonyl group, more preferably a cycloalkylcarbonyl group or an arylcarbonyl group, which each have a cyclic structure, and particularly preferably an arylcarbonyl group.

Examples of the alkylcarbonyl group include acetyl, propionyl, butyryl and pivaloyl, examples of the cycloalkylcarbonyl group include cyclopropylcarbonyl, cyclopentylcarbonyl and cyclohexylcarbonyl, and examples of the arylcarbonyl group include benzoyl, toluoyl and naphthoyl.

Examples of the alkyl group substituted by an acyl group include a 2-acylethyl group, a 3-acylpropyl group and a 2-acylpropyl group, and a 2-acylethyl group is preferred.

The alkyl group substituted by an acyl group in the invention is particularly preferably an alkyl group substituted by both an acyl group and an aryl group, and the aryl group in this case is preferably a phenyl group.

Examples of the alkyl group substituted by an acyl group and an aryl group include 1-phenyl-2-benzoylethyl and 1-tolyl-2-benzoylethyl.

Examples of the cycloalkyl group include those exemplified for $R^1$, $R^3$ and $R^5$ above.

Preferable example of the compounds represented by the formula (21) is the followings.

At least one of $R^1$, $R^3$ and $R^5$ is an alkyl group substituted with an aromatic ring group.

Among the alkyl groups substituted with an aromatic ring group, those having one or two aryl groups substituted on the alkyl group are preferred (two aryl groups, if any, preferably substitute on the same carbon atom). Alkyl group may also have aryl group and acyl group (preferably aryloyl group) substituted thereon.

At least one of $R^1$, $R^3$ and $R^5$ is a cycloalkyl group-containing group which is preferably a cycloalkyl group.

The cyclic structure in the case where the total number of cyclic structures present in $R^1$, $R^3$ and $R^5$ is 3 or more includes the case where the basic skeleton itself of $R^1$, $R^3$ and $R^5$ as a substituent has a cyclic structure, and also includes as described above the case where the substituent on $R^1$, $R^3$ and $R^5$ has a cyclic structure.

The cyclic structure is preferably a cyclic saturated hydrocarbon structure or an aromatic cyclic structure (such as an aromatic hydrocarbon structure or an aromatic heterocyclic structure). The cyclic structure may be a condensed ring structure.

In the case where the cyclic structure is a cyclic saturated hydrocarbon structure, the cyclic saturated hydrocarbon structure is preferably present as a cycloalkyl group having from 3 to 20 carbon atoms. More specifically, the cyclic saturated hydrocarbon structure is more preferably present as a cyclopropyl group, a cyclopentyl group or a cyclohexyl group, and is particularly preferably present as a cyclohexyl group.

In the case where the cyclic structure is an aromatic cyclic structure, the cyclic structure is preferably an aromatic hydrocarbon structure. The aromatic hydrocarbon structure is preferably present as an aryl group having from 6 to 20 carbon atoms. More specifically the aromatic hydrocarbon structure is more preferably present as a phenyl group or a naphthyl group, and is particularly preferably present as a phenyl group.

The cyclic structure may have a substituent, and is preferably unsubstituted. In the case where the cyclic structure has a substituent, the preferred ranges of the substituent are the same as the substituent that may be substituted on the groups of $R^1$, $R^3$ and $R^5$.

In the compound represented by the formula (21), $R^1$, $R^3$ and $R^5$ each more preferably represent an alkyl group, an alkenyl group or an aryl group. $R^1$, $R^3$ and $R^5$ each preferably have at least one cyclic structure, and each more preferably have one cyclic structure.

The compound represented by the formula (21) preferably has a molecular weight of from 250 to 1,200, more preferably from 300 to 800, and particularly preferably from 350 to 600.

In the case where the molecular weight is in the preferred range, the compound represented by the formula (21) may be excellent in prevention of elimination through evaporation from the optical film of the invention, thereby providing an optical film having high transparency.

Specific examples of the compounds represented by the formula (21) are shown below. The invention is not limited to or by these specific examples.

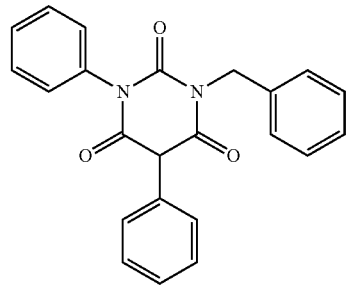

A-1

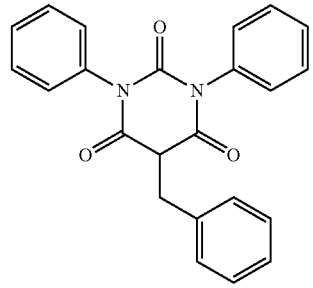

A-2

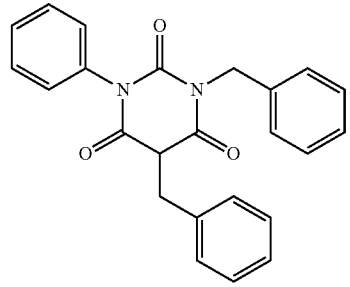

A-3

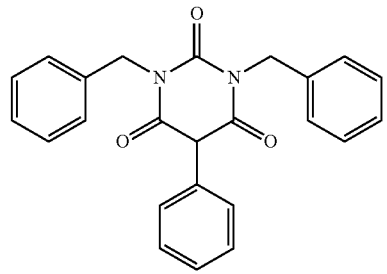

A-4

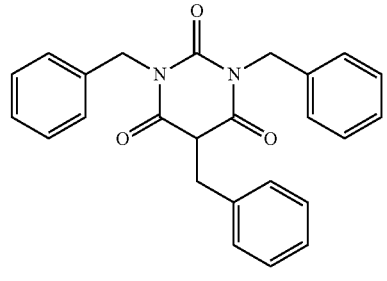

A-5

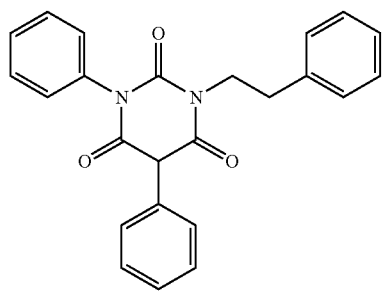 A-6
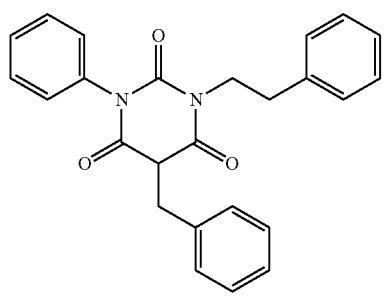 A-7
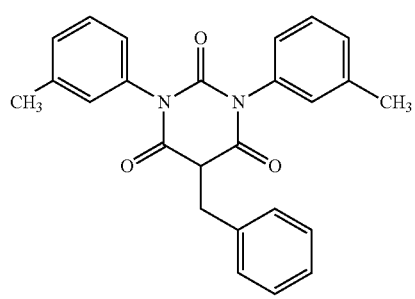 A-8
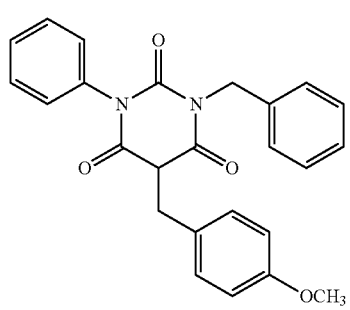 A-9
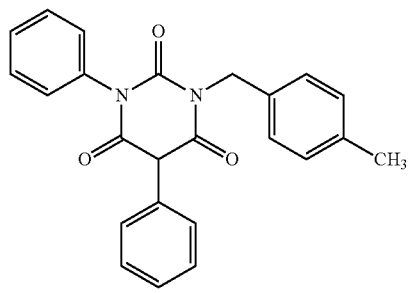 A-10
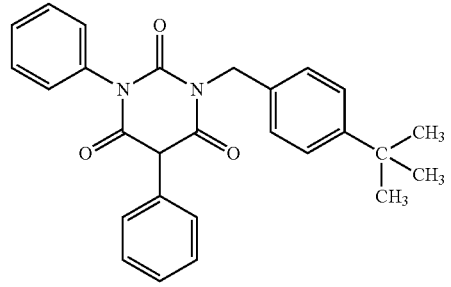 A-11
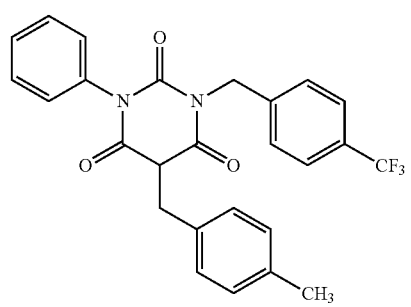 A-12
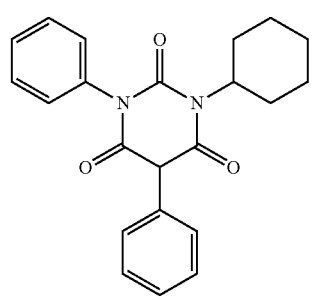 A-13
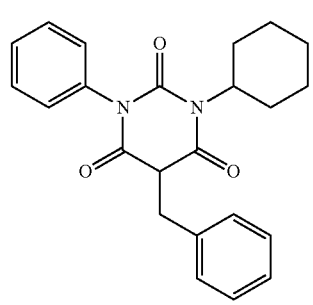 A-14
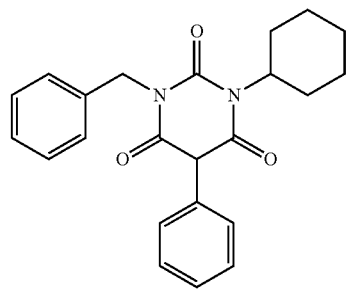 A-15

-continued
A-16 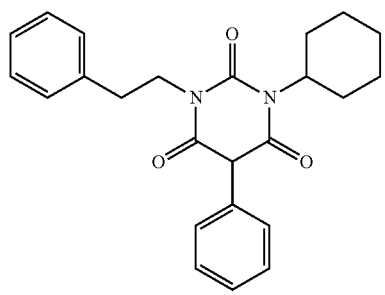
A-17 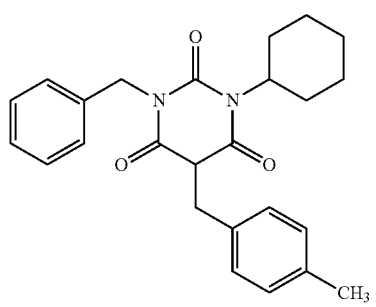
A-18 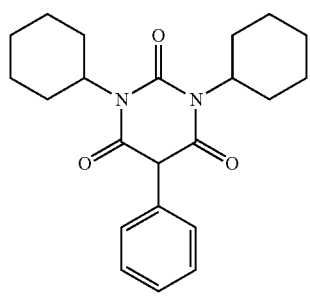
A-19 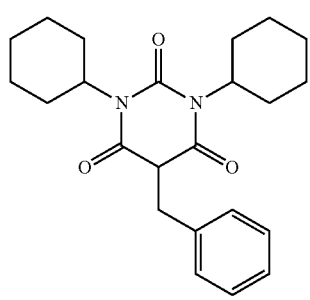
A-20 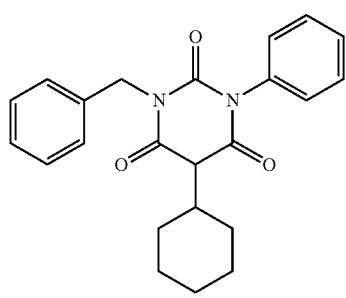
-continued
A-21 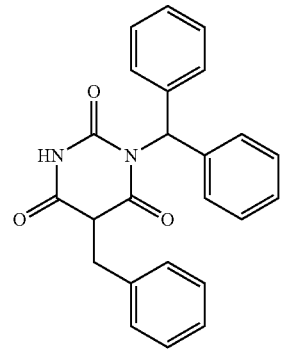
A-22 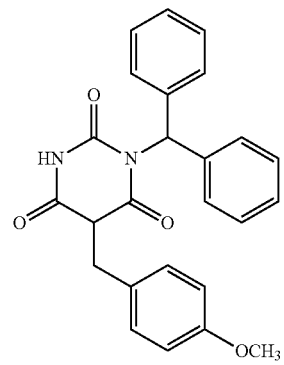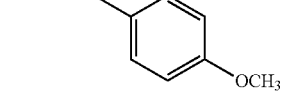
A-23 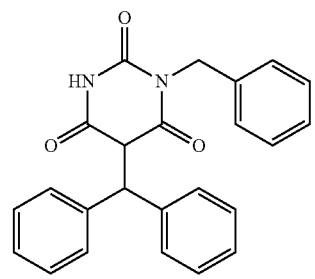
A-24 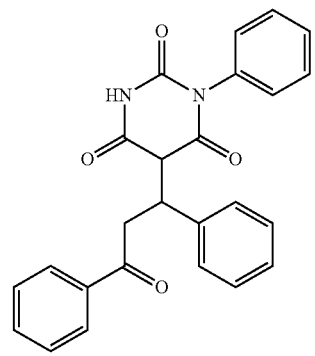

A-25 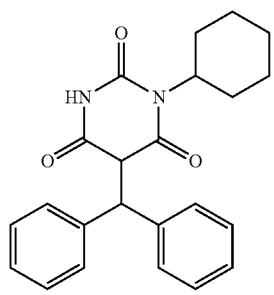
A-26 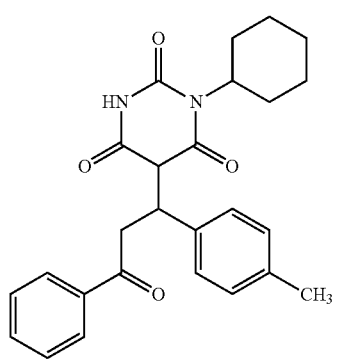
A-27 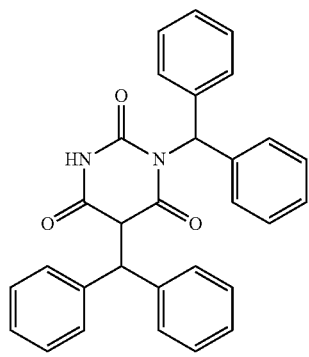
A-28 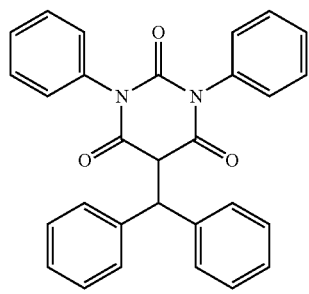
A-29 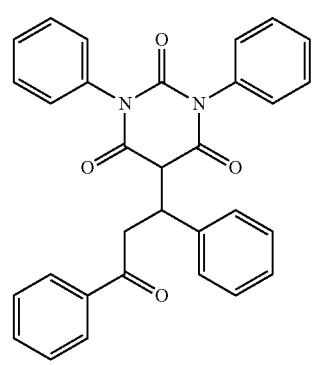
A-30 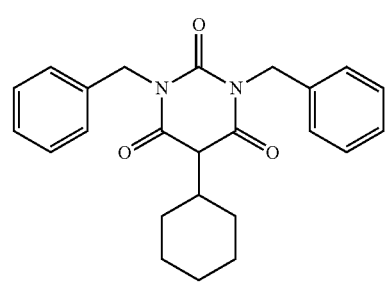
A-31 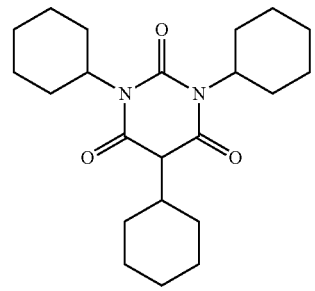
A-32 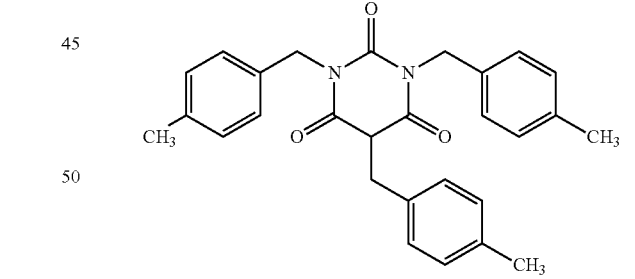
A-33 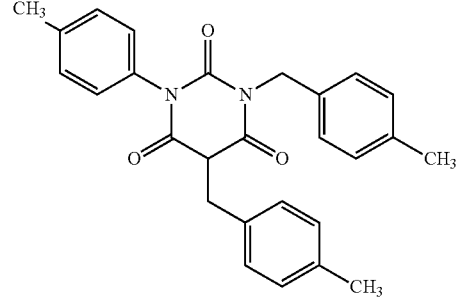

-continued
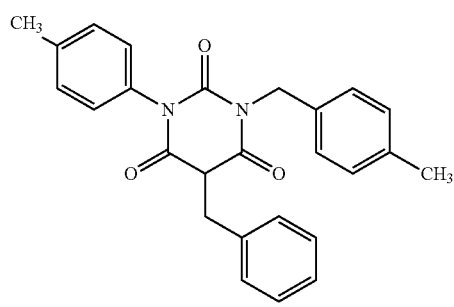
A-34
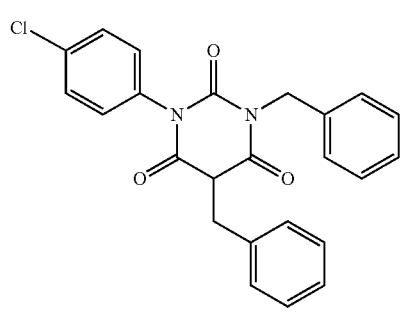
A-35
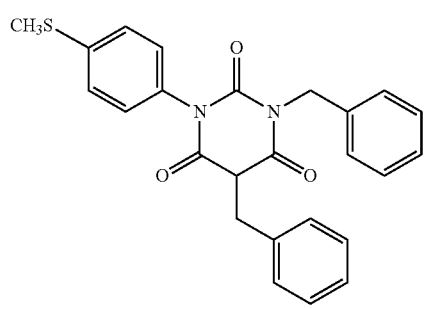
A-36
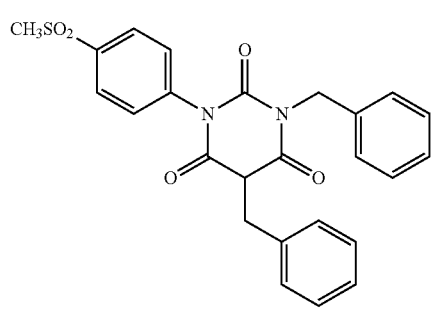
A-37
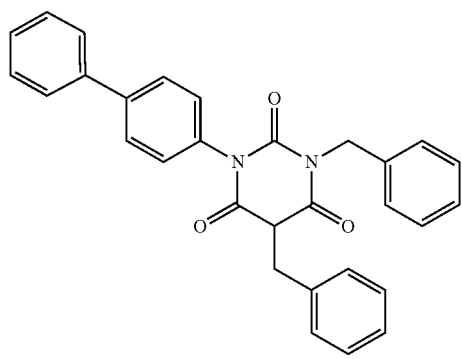
A-38
-continued
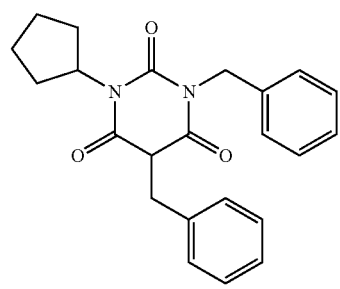
A-39
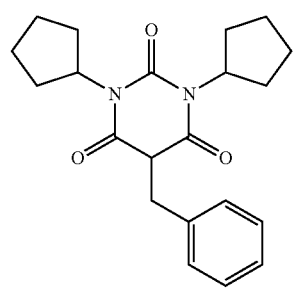
A-40
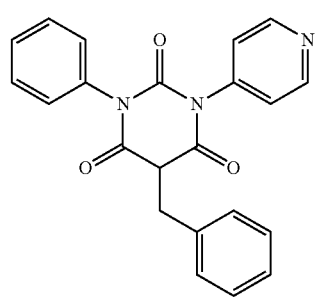
A-41
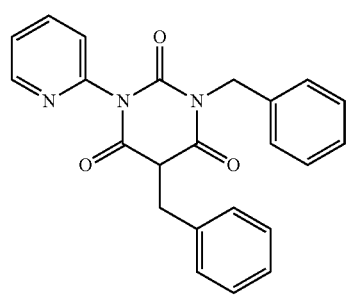
A-42
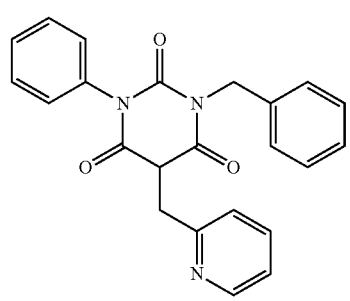
A-43

A-44

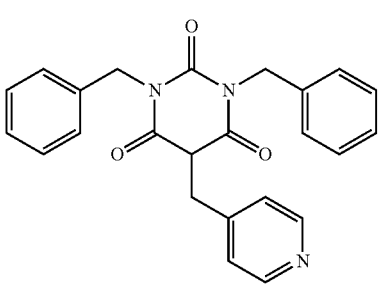

A-45

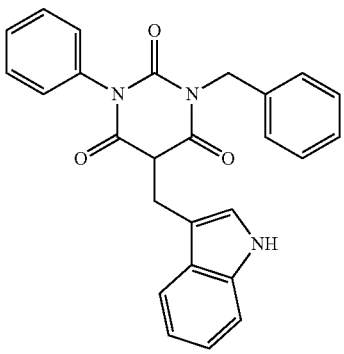

A-46

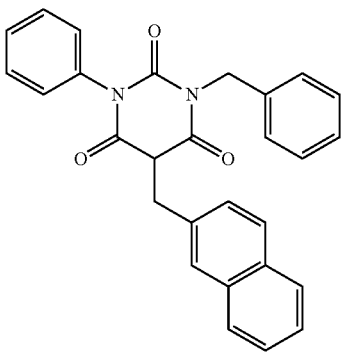

A-47

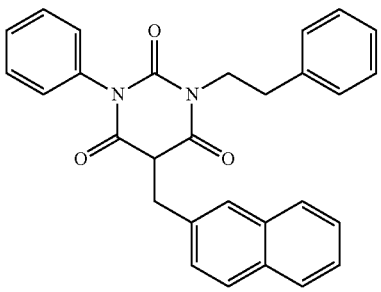

A-48

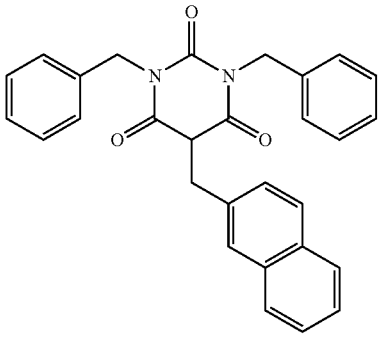

The compound represented by the formula (21) and the compound represented by the formula (1-2) are known to be synthesized by a method of synthesizing barbituric acid, based on condensation of an urea derivative with a malonic acid derivative. Barbituric acid having two substituents on the N atoms may be obtained by heating a N,N'-disubstituted urea with malonyl chloride, or by heating with a combination of malonic acid and an activator such as acetic anhydride. For example, methods described in Journal of the American Chemical Society, vol. 61, p. 1015 (1939), *Journal of Medicinal Chemistry*, vol. 54, p. 2409 (2011), *Tetrahedron Letters*, vol. 40, p. 8029 (1999), and WO2007/150011 are preferably used.

Both unsubstituted and substituted malonic acids are acceptable for use in the condensation. By using malonic acid having any of correspondent substituents for $R^5$ so as to configure barbituric acid, the compounds represented by the formula (21) may be synthesized. The compound represented by the formula (21) and the compound represented by the formula (1-2) may be synthesized alternatively by modifying barbituric acid unsubstituted at the 5-position, which is obtainable by condensing unsubstituted malonic acid with an urea derivative.

The 5-position of barbituric acid which is used for introduction of substituent corresponding to $R^5$ in the formula (21) may be modified by a nucleophilic substitution reaction with a halogenated alkyl compound, or by an addition reaction such as the Michael addition reaction. Also a method using dehydrating condensation with an aldehyde or ketone to produce an alkylidene or arylidene compound, and then reducing the double bond is preferably used. For example, reduction process by zinc is described in *Tetrahedron Letters*, 44, p. 2203 (2003), and reduction process by contact reduction is described in *Tetrahedron Letters*, 42, p. 4103 (2001) and *Journal of the American Chemical Society*, 119, p. 12849 (1997), and reduction process by $NaBH_4$ is described in *Tetrahedron Letters*, 28, p. 4173 (1987). They are synthesis methods preferably used in the case where barbituric acid has an aralkyl group or a cycloalkyl group at 5-position.

Methods of synthesizing the compound represented by the formula (21) usable in the invention are not limited to those described above.

The total content of the compound represented by the formula (21) in the optical film of the invention is not specifically limited. The total content is preferably from 0.1 to 15% by mass, more preferably from 0.2 to 10% by mass, particularly preferably from 0.3 to 5% by mass based on the cellulose acylate.

When the content is 0.1% by mass or more based on the cellulose ester, the improving effect of the durability of the polarizer and the improving effect of the peeling property may be sufficiently obtained. When the content is 15% by mass or less based on the cellulose ester, it is preferred since the organic acid may be difficult to bleed out with the lapse of time at a high temperature and high humidity environment, and the orthogonal transmission of the polarizing plate is difficult to be increased.

The range of the durability improving agent for a polarizer used in the optical film of the invention includes an optical film containing a compound represented by the formula (21) in the form of hydrate, solvate or salt. In the invention, the hydrate may contain organic solvent, and the solvate may contain water. In other words, the "hydrate" and "solvate" include "mixed solvate" containing both of water and organic solvent.

Examples of the solvent possibly contained in the solvate include any of general organic solvents. Specific examples include alcohols (such as methanol, ethanol, 2-propanol, 1-butanol, 1-methoxy-2-propanol and t-butanol), esters (such as ethyl acetate), hydrocarbons (both of aliphatic and aromatic hydrocarbons are acceptable, such as toluene, hexane and heptane), ethers (such as diethyl ether and tetrahydrofuran), nitriles (such as acetonitrile), and ketones (such as acetone and 2-butanone). Alcoholic solvate is preferred, which more preferably contains methanol, ethanol, 2-propanol or 1-butanol. These solvents may be any of reaction solvents used for synthesizing the compound represented by the formula (1), may be solvents used for crystallization and purification after the synthesis, or may be mixtures of them.

Two or more species of solvents may concurrently be contained, or water and solvent may be contained together (for example, water and alcohol (such as methanol, ethanol, and t-butanol)).

The salt includes acid addition salt composed of an inorganic or organic acid. The inorganic acid is exemplified by hydrohalogenic acids (hydrochloric acid, hydrobromic acid), sulfuric acid and phosphoric acid. The organic acid is exemplified by acetic acid, trifluoroacetic acid, oxalic acid and citric acid, and further by alkanesulfonic acids (methanesulfonic acid), and arylsulfonic acids (benzenesulfonic acid, 4-toluenesulfonic acid, 1,5-naphthalenedisulfonic acid).

The salt is exemplified by those formed when the acidic moiety in the parent compound is substituted by a metal ion (such as alkali metal salt including sodium and potassium salts, alkali earth metal salt including calcium and magnesium salts, ammonium salt, alkali metal ion, alkali earth metal ion, and aluminum ion), or when prepared using an organic base (ethanolamine, diethanolamine, triethanolamine, morpholine, piperidine), but not limited thereto. Among them, sodium salt and potassium salt are preferred.

Additional Additive

The optical film of the embodiment may further contain at least one kind of an additional additive in such a range that does not impair the advantageous effects of the invention. Examples of the additional additive include a polymer plasticizer except for the polyester containing the repeating unit represented by the formula 1A and having a blocked terminal (for example, a phosphate ester plasticizer, a carboxylate ester plasticizer, a polycondensation oligomer plasticizer and the like), an ultraviolet ray absorbent, an antioxidant, and a matting agent described later.

The content of the additional additive contained in the optical film of the embodiment is preferably 3% by mass or less, and more preferably 1% by mass or less, based on the cellulose ester, and the additional additive is further preferably not contained.

The content of a retardation inducing agent (which includes a retardation reducing agent) in the optical film of the embodiment is preferably 3% by mass or less, and more preferably 1% by mass or less, based on the cellulose ester, and the retardation inducing agent is further preferably not contained.

Additional Polymer Plasticizer

The optical film of the embodiment may contain an additional polymer plasticizer in such a range that does not impair the advantageous effects of the invention. Examples of the polymer plasticizer include a polyester polyurethane plasticizer, an aliphatic hydrocarbon polymer, an alicyclic hydrocarbon polymer, an acrylic polymer, such as a polyacrylate ester and a polymethacrylate ester (examples of the ester-forming group of which include a methyl group, an ethyl group, a propyl group, a butyl group, an isobutyl group, a pentyl group, a hexyl group, a cyclohexyl group, an octyl group, a 2-ethylhexyl group, a nonyl group, an isononyl group, a tert-nonyl group, a dodecyl group, a tridecyl group, a stearyl group, an oleyl group, a benzyl group and a phenyl group), a vinyl polymer, such as a polyvinyl isobutyl ether and poly-N-vinylpyrrolidone, a styrene polymer, such as polystyrene and poly-4-hydroxystyrene, a polyether, such as polyethylene oxide and polypropylene oxide, a polyamide, a polyurethane, a polyurea, a phenol-formaldehyde condensate, a urea-formaldehyde condensate, and vinyl acetate.

Among these, an acrylic polymer is preferably used in combination. In the embodiment, a homopolymer or a copolymer synthesized from a monomer, such as an alkyl acrylate or methacrylate ester, is preferred as the acrylic polymer.

Example of an acrylate ester monomer having no aromatic ring include methyl acrylate, ethyl acrylate, propyl (including isopropyl and n-propyl) acrylate, butyl (including n-butyl, isobutyl, s-butyl and t-butyl) acrylate, pentyl (including n-pentyl, isopentyl and s-pentyl) acrylate, hexyl (including n-hexyl and isohexyl) acrylate, heptyl (including n-heptyl and isoheptyl) acrylate, octyl (including n-octyl and isooctyl) acrylate, nonyl (including n-nonyl and isononyl) acrylate, myristyl (including n-myristyl and isomyristyl) acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate 2-ethoxyethyl acrylate, and compounds obtained by replacing the acrylate of the aforementioned compound by methacrylate. Examples of an acrylic monomer used for the acrylic polymer having an aromatic ring include styrene, methylstyrene and hydroxystyrene.

In the case where the acrylic polymer is a copolymer, the copolymer may contain an X component (a monomer component having a hydrophilic group) and a Y component (a monomer component having no hydrophilic group), and the molar ratio X/Y is preferably from 1/1 to 1/99. The content of the acrylic polymer is preferably from 1 to 20% by mass based on the cellulose ester. The acrylic polymer may be synthesized with reference, for example, to the method described in JP-A-2003-12859.

Antioxidant

The optical film of the invention may contain a known antioxidant, such as a phenol antioxidant and a hydroquinone antioxidant, e.g., 2,6-di-tert-butyl-4-methylphenol, 4,4'-thiobis(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone and pentaerythritol tetrakis[3-(3,5-di-tert-butyl-4-hydroxyphenyl)propionate]. Furthermore, a phosphorous antioxidant may be preferably contained, such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite and bis(2,4-di-tert-butylpheny)pentaerythritol diphosphite. The amount of the antioxidant added in the optical film of the invention is preferably from 0.05 to 5.0 parts by mass per 100 parts by mass of the cellulose ester.

Production Method of Optical Film

The method for producing the optical film of the invention is not particularly limited, and the optical film may be produced by any known method. Examples of the production method include a solution casting film forming method and a melt film forming method. For enhancing the surface property of the optical film, the optical film of the invention is preferably produced by a solution casting film forming method. An embodiment where the optical film is produced by a solution casting film forming method will be described below, but method for producing the optical film of the invention is not limited to a solution casting film forming method. For producing the optical film by a melt casting method, any known method may be used.

Polymer Solution

In the solution casting film forming method, a polymer solution (i.e., a cellulose ester solution) containing the above cellulose ester, the polyester having a recurring unit represented by the above formula 1A and a terminal structure formed by reaction with a monoalcohol or a monocarboxylic acid, and the various additives depending on necessity is used for forming a web. The polymer solution that may be used in the solution casting film forming method (which may be hereinafter referred to as a cellulose acylate solution) will be described below.

Solvent

The cellulose ester used in the embodiment is dissolved in a solvent to form a dope, which is then cast on a substrate to form a film. It is necessary in this case to evaporate the solvent after extrusion or casting, a volatile solvent is preferably used.

The solvent is preferably such a solvent that does not undergo reaction with a reactive metal compound, a catalyst and the like, and does not dissolve the substrate for casting. Two or more kinds of solvents may be used in combination.

The cellulose ester and a reactive metal compound may be dissolved in separate solvents respectively, and the resulting solution may be mixed with each other.

An organic solvent that has good solubility is referred to as a good solvent, and a solvent that exhibits major effect of dissolution and is used in a large amount is referred to as a major (organic) solvent.

Examples of the good solvent include a ketone compound, such as acetone, methyl ethyl ketone, cyclopentanone and cyclohexanone, an ether compound, such as tetrahydrofuran (THF), 1,4-dioxane, 1,3-dioxolane and 1,2-dimethoxyethane, and an ester compound, such as methyl formate, ethyl formate, methyl acetate, ethyl acetate, amyl acetate and γ-butyrolactone, and also include methyl cellosolve, dimethylimidazoline, dimethylformamide, dimethylacetamide, acetonitrile, dimethylsulfoxide, sulfolane, nitroethane, methylene chloride and methyl acetoacetate, and 1,3-dioxolane, THF, methyl ethyl ketone, acetone, methyl acetate and methylene chloride are preferred.

The dope preferably contains an alcohol having from 1 to 4 carbon atoms in an amount of from 1 to 40% by mass in addition to the organic solvent.

The alcohol may be used as a gelation solvent, in which after casting the dope on a metal support, the web (a dope film obtained by casting the dope of the cellulose acylate may be referred to as a web) is gelled by increasing the proportion of the alcohol due to evaporation of the solvent, thereby facilitating the release of the web from the metal support, and in the case where the proportion of the alcohol is small, the alcohol may accelerate the dissolution of the cellulose acylate in a non-chlorine organic solvent, and also suppresses a reactive metal compound from being gelled, deposited and increased in viscosity.

Examples of the alcohol having from 1 to 4 carbon atoms include methanol, ethanol, n-propanol, isopropanol, n-butanol, sec-butanol, tert-butanol and propylene glycol monomethyl ether.

Among these, methanol and ethanol are preferred since they have a relatively low boiling point and good drying property, and have no toxicity. The most preferred is ethanol. This kind of organic solvents has no dissolution power to the cellulose ester by itself and thus is referred to as a poor solvent.

The cellulose ester as a raw material of the cellulose ester in the embodiment contains a hydrogen bonding functional group, such as a hydroxyl group, an ester group and a ketone group, and thus the alcohol is preferably contained in the total solvent in an amount of from 5 to 30% by mass, more preferably from 7 to 25% by mass, and further preferably from 10 to 20% by mass, for reducing the releasing load from the casting support.

In the embodiment, water may be contained in a small amount, which is effective for enhancing the viscosity of the solution and the wet web strength on drying, and for enhancing the dope strength on drum casting. For example, water may be contained in an amount of from 0.1 to 5% by mass, preferably from 0.1 to 3% by mass, and particularly preferably from 0.2 to 2% by mass.

Preferred examples of the combination of organic solvents used as the solvent for the polymer solution in the embodiment include those described in JP-A-2009-262551.

A non-halogen organic solvent may be used as the major solvent depending on necessity, the details of which are described in JIII Journal of Technical Disclosure Monthly, 2001-1745, Mar. 15, 2001.

The concentration of the cellulose ester in the polymer solution in the embodiment is preferably from 5 to 40% by mass, more preferably from 10 to 30% by mass, and most preferably from 15 to 30% by mass.

The concentration of the cellulose ester may be controlled to the prescribed concentration in the stage where the cellulose ester is dissolved in the solvent. Alternatively, a solution having a low concentration (for example, from 4 to 14% by mass) may be prepared in advance and then concentrated by evaporating the solvent. A solution having a high concentration may be prepared in advance and the diluted. The concentration of the cellulose ester may be lowered by adding the additive.

The stage where the additive is added may be appropriately determined depending on the kind of the additive. For example, an aromatic ester oligomer and a UV absorbent may be dissolved in an organic solvent, such as an alcohol, e.g., methanol, ethanol and butanol, methylene chloride, methyl acetate, acetone and dioxolane, or a mixed solvent thereof, and then added to the dope, or may be added directly to the dope. A material that is not dissolved in an organic solvent, such as an inorganic powder material, may be dispersed in an organic solvent and the cellulose ester with a dissolver or a sand mill, and then added to the dope.

Examples of the solvent that is most suitable for dissolving the cellulose ester in a high concentration include a mixed solvent of methylene chloride and ethyl alcohol in a ratio of from 95/5 to 80/20, and a mixed solvent of methyl acetate and ethyl alcohol in a ratio of from 60/40 to 95/5.

(1) Dissolving Step

In this step, the cellulose ester and the additive are dissolved in an organic solvent mainly containing a good solvent in a dissolving tank to form a dope, or the cellulose ester solution and the additive solution are mixed to form a dope.

Examples of the method for dissolving the cellulose ester include a method of dissolving under ordinary pressure, a method of dissolving at a temperature lower than the boiling point of the major solvent, a method of dissolving under pressure at a temperature higher than the boiling point of the major solvent, a cooling dissolving method described in JP-A-9-95544, JP-A-9-95557 and JP-A-9-95538, and a method of dissolving under high pressure described in JP-A-11-21379, and a method of dissolving under pressure at a temperature higher than the boiling point of the major solvent is preferably employed.

The concentration of the cellulose ester in the dope is preferably from 10 to 35% by mass. After the additive is added, dissolved and dispersed in the dope after or during the dissolution of the cellulose ester, the dope is preferably filtered with a filter, deaerated and then fed to the next step with a liquid feed pump.

(2) Casting Step

In this step, the dope is fed to a pressure die with a liquid feed pump (such as a pressure metering pump) and cast through the slit of the pressure die onto a casting position of a metal support, such as an endlessly running endless metal belt, e.g., a stainless steel belt, or a rotating metal drum.

The pressure die preferably has at the top thereof a slit capable of being adjusted in the shape thereof for controlling the film thickness uniformly. Examples of the pressure die include a coat hanger die and a T-die, any of which may be preferably used. The metal support has a mirror surface. For enhancing the film forming speed, two or more pressure dies may be provided on the metal support, to which the amount of the dope is distributed, and plural dope films may be laminated. Alternatively, a film having a laminate structure is preferably obtained by a co-casting method, in which plural dopes are cast simultaneously.

(3) Solvent Evaporating Step

In this step, the web (which is a precursor of the completed optical film and contains a large amount of the solvent) is heated on the metal support, thereby evaporating the solvent to such an extent that the web is capable of being released from the metal support.

For evaporating the solvent, such a method may be employed as a method of blowing air from the side of the web, a method of conducting heat with a liquid from the back surface of the metal support, a method of conducting heat by radiation on both the front and back surface thereof, and the like, and a method of conducting heat with a liquid from the back surface is preferred due to the good drying efficiency obtained thereby. Combinations of these methods may also be preferably employed. In the method of conducting heat with a liquid from the back surface, the metal support is preferably heated to a temperature that is lower than the boiling point of the major solvent of the organic solvents used in the dope or the boiling point of the organic solvent having the lowest boiling point therein.

(4) Releasing Step

In this step, the web, from which the solvent has been evaporated on the metal support, is released therefrom at a releasing position. The web thus released is sent to the next step. When the residual solvent amount (see the expression below) of the web on releasing is too large, it may be difficult to release the web, and when the web has been dried excessively on the metal support, the web may be broken partly on releasing.

A gel casting method may be employed as a method of enhancing the film forming speed (the film forming speed may be increased by releasing at a large residual solvent amount as much as possible. Examples of the gel casting method include a method of adding a poor solvent to the cellulose ester to the dope, and gelling the dope after casting the dope, and a method of gelling the dope by decreasing the temperature of the metal support. The dope film may be increased in strength by gelling on the metal support, thereby facilitating the release and increasing the film forming speed.

The residual solvent amount on releasing the web from the metal support is preferably in a range of from 5 to 150% by mass while depending on the strength of the drying condition, the length of the metal support and the like, and in the case where the web is released at a larger residual solvent amount, the residual solvent amount on releasing may be determined in consideration of the economical speed and the quality. In the embodiment, the temperature of the metal support at the releasing position is preferably from −50 to 40° C., more preferably from 10 to 40° C., and most preferably from 15 to 30° C.

The residual solvent amount of the web at the releasing position is preferably from 10 to 150% by mass, and more preferably from 10 to 120% by mass.

The residual solvent amount is expressed by the following expression.

$$\text{residual solvent amount (\% by mass)} = [(M-N)/N] \times 100$$

wherein M represents the mass of the web at an arbitrary time point, and N represents the mass of the web having the mass M that has been dried at 110° C. for 3 hours.

(5) Drying or Heat-Treating Step and Stretching Step

After the releasing step, the web is preferably dried with a drying device, in which the web is passed through plural rolls alternately, and/or a tenter device, in which the web is conveyed with both terminals thereof held with a clip.

In the case where the web is heat-treated in the embodiment, the heat treatment temperature may be less than (Tg—5° C.), preferably (Tg—20° C.) or more and less than (Tg—5° C.), and more preferably (Tg—15° C.) or more and less than (Tg—5° C.). Tg represents a glass transition temperature.

The heat treatment time is preferably 30 minutes or less, more preferably 20 minutes or less, and particularly preferably approximately 10 minutes.

The measure for drying and heat-treating the web may be generally hot air blown on the web, or may be microwave applied thereto instead of hot air. The temperature, the air flow amount and the time may vary depending on the solvent used, and the conditions may be appropriately selected depending on the kind and the combination of the solvent.

The web may be stretched in any one direction of the film conveying direction (MD: machine direction) and the transversal direction (TD: perpendicular to the film conveying direction) or may be biaxially stretched in both the directions. The web is preferably biaxially stretched. The stretching may be performed by a single step or multiple steps. The tensile modulus may be controlled to the aforementioned range by controlling the kind of the cellulose acylate and the acylation degree thereof, and selecting the additives and controlling the proportions thereof.

The stretching ratio in MD, i.e., the film conveying direction, is preferably from 0 to 20%, more preferably from 0 to 15%, and particularly preferably from 0 to 10%. The stretching ratio (i.e., elongation) of the web on stretching may be achieved by the difference in circumferential speed between the metal support and the releasing speed (e.g., the drawing speed of releasing roll). For example, in the case where an equipment having two nip rolls is used, the rotation speed of the nip roll on the side of outlet is rendered larger than the rotation speed of the nip roll on the side of inlet, thereby stretching the film favorably in the conveying direction, i.e., MD. The tensile modulus in MD may be controlled by performing the stretching.

The stretching ratio (%) referred herein means a value defined by the following expression.

stretching ratio (%)=100×[(length after stretching)−(length before stretching)]/(length before stretching)

The stretching ratio in TD, i.e., the direction perpendicular to the film conveying direction, is preferably from 0 to 30%, more preferably from 1 to 20%, and particularly preferably from 5 to 15%.

In the embodiment, the web is preferably stretched in TD, i.e., the direction perpendicular to the film conveying direction, with a tenter device.

In the biaxial stretching, the web may be relaxed, for example, by from 0.8 to 1.0 time in the film conveying direction to provide a desired retardation value. The stretching ratio may be determined depending on various purposes. The optical film of the invention may be uniaxially stretched in MD in production.

The temperature on stretching is preferably Tg or less, thereby increasing the tensile modulus in the stretching direction. The stretching temperature is preferably from (Tg—50° C.) to Tg, and more preferably from (Tg—30° C.) to (Tg—5° C.). When the web is stretched at a temperature within the range, there is a tendency that the tensile modulus in the stretching direction is increased, whereas the tensile modulus in the direction perpendicular thereto is decreased. Accordingly, for increasing the tensile modulus in both MD and TD, the web is preferably stretched in both the directions, i.e., biaxially stretched, at a temperature within the range.

The web may be dried after stretching. In the case where the web is dried after the stretching step, the drying temperature, the drying air flow amount and the drying time may vary depending on the solvent used, and the drying condition may be appropriately selected depending on the kind of the solvent and the combination thereof. In the embodiment, the drying temperature after the stretching step is preferably lower than the stretching temperature in the stretching step for increasing the front contrast on installing the film in a liquid crystal display device.

(6) Winding Step

The thus resulting film is preferably wound in a length of from 100 to 10,000 m, more preferably from 500 to 7,000 m, and further preferably from 1,000 to 6,000 m, per roll. The width of the film is preferably from 0.5 to 5.0 m, more preferably from 1.0 to 3.0 m, and further preferably from 1.0 to 2.5 m. On winding the film, the film is preferably subjected to knurling on at least one edge thereof, and the knurling preferably has a width of from 3 to 50 mm, and more preferably from 5 to 30 mm, and a height of from 0.5 to 500 μm, and more preferably from 1 to 200 μm. The knurling may be single wheel knurling or double wheel knurling.

The thus obtained web is wound to complete the optical film.

Layer Structure

The optical film having a functional layer described later may be also referred to as an optical film inclusively with the functional layer, and the optical film except for the functional layer may be referred to as a film containing a cellulose ester. The optical film except for a functional layer used in the invention (i.e., the film containing a cellulose ester) may be a single layer film or may have a laminated layer structure including two or more layers. For example, the optical film preferably has a laminated layer structure containing two layers, a core layer and an outer layer (which may also be referred to as a surface layer or a skin layer), or a laminated layer structure containing three layers, an outer layer, a core layer and an outer layer. The laminated layer structure is preferably produced by co-casting.

In the case where the optical film of the invention has a laminated layer structure containing two or more layers, the outer layer preferably contains a matting agent. Examples of the matting agent used include those described in JP-A-2011-127045, and for example, silica particles having an average particle size of 20 nm may be used.

Thickness of Optical Film

The thickness of the optical film is from 10 to 45 μm, preferably from 15 to 35 μm, more preferably from 15 to 30 μm, and particularly preferably less than 30 μm from the standpoint of thin film thickness The in-plane retardation (Re) at a wavelength of 590 nm under an environment of 25° C. and 60% RH of the optical film is preferably from −5 to 5 nm, more preferably from 0 to 5 nm, and particularly preferably from 0 to 3 nm.

Retardation of Optical Film

The in-plane retardation (Re) at a wavelength of 590 nm under an environment of 25° C. and 60% RH of the optical film of the invention is preferably from −5 to 5 nm, more preferably from 0 to 3 nm, and further preferably from 0 to 2 nm.

The retardation in thickness direction (Rth) at a wavelength of 590 nm under an environment of 25° C. and 60% RH of the optical film of the invention is preferably from −5 to 5 nm, more preferably from −3 to 3 nm, and further preferably −2 to 2 nm.

The values Re(λ) and Rth(λ) herein mean the in-plane retardation and the retardation in thickness direction, respectively, at a wavelength λ. The wavelength λ herein is 590 nm unless otherwise indicated in the specification. Re(λ) may be measured with KOBRA 21ADH (available from Oji Scientific Instruments Co., Ltd.) by making light having a wavelength of λ nm incident in the normal line direction of the film. Rth(λ) may be obtained in such a manner that Re(λ) is measured for 6 points by making light having a wavelength of λ nm incident at angles of from the normal line direction to 50° for each terminals with a step of 10° with the in-plane retardation axis being the tilting axis (rotation axis) (when there is no retardation axis, an arbitrary direction within the plane of the film is designated as the rotation axis), and Rth(λ) is calculated with KOBRA 21ADH based on the retardation values thus measured, the assumed value of the average refractive index and the thickness of the film thus input. Rth may also be obtained in such a manner that retardation values are measured in arbitrary two directions with the retardation axis being the tilting axis (rotation axis) (when there is no retardation axis, an arbitrary direction within the plane of the film is designated as the rotation axis), and Rth is calculated from the following expressions (A) and (B) based on the retardation values thus measured, the assumed value of the average refractive index and the thickness of the film thus input. The assumed value of the average refractive index used herein may be values shown in Polymer Handbook (John Wiley & Sons, Inc.) and catalogs of various optical films. For a film with no known average refractive index, the refractive index thereof may be measured with an Abbe refractometer. The average refractive indices of major optical films are shown below: cellulose acylate (1.48), cycloolefin polymer (1.52), polycarbonate (1.59), polymethyl methacrylate (1.49) and polystyrene (1.59). KOBRA 21ADH calculates nx, ny and nz based on the assumed value of the average refractive index and the thickness of the film thus input, and based on nx, ny and nz, Nz=(nx−nz)/(nx−ny) is further calculated.

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Expression (A)

$$Rth = ((nx+ny)/2 - nz) \times d$$

Expression (B)

Re(θ) represents the retardation value in the direction that is tilted from the normal line direction by an angle θ, nx, ny and nz represent the refractive indices of the index ellipsoid in the main axis azimuths respectively, and d represents the thickness of the film.

Tensile Modulus of the Optical Film

The tensile modulus (tensile elastic modulus) of the optical film of the invention is preferably 4.2 GPa or more, more preferably 4.3 GPa or more, and particularly preferably 4.5 GPa or more. The upper limit of the tensile modulus is not particularly limited and is generally 10 GPa or less. When the tensile modulus is 4.2 GPa or more, the film may have an enhanced rigidity.

When the optical film of the invention has high rigidity, the optical film that has a reduced thickness may have good handling property, thereby providing a film that has high deformation resistance on storing after winding the film and has a less amount of appearance failure (which may be referred to as a concave dent bump).

The tensile modulus may be measured in such a manner that the stress at an elongation of 0.5% is measured with a versatile tensile tester "STM T50BP", available from Baldwin Japan, Ltd., at a tensile speed of 10% per minute at 23° C. and 60% RH, and the average value of the tensile moduli in MD and TD is designated as the tensile modulus.

Use of Optical Film

The optical film of the invention is useful as various purposes including a protective film for a polarizing plate, a surface protective film disposed on an image display surface, and the like. For imparting functions suitable for the purposes, the optical film of the invention may have, for example, a hardcoat layer, an antiglare layer, a clear hardcoat layer, an antireflection layer, an antistatic layer and an antifouling layer.

The optical film of the invention contains the film containing the cellulose ester described above, and thus has good adhesion property to a polarizer, and therefore the optical film is suitable for the use in a liquid crystal display device having a polarizing plate as an essential member.

The protective film for a polarizing plate used on the front side of the display device such as a liquid crystal display device preferably has an antiglare layer and a clear hardcoat layer, and also an antireflection layer, an antistatic layer and an antifouling layer.

In the production of a polarizing plate with the optical film of the invention that has an in-plane retardation axis, the optical film is preferably adhered in such a manner that the in-plane retardation axis is in parallel to or perpendicular to the transmission axis of the polarizer.

Polarizing Plate

The polarizing plate of the invention contains a polarizer and at least one sheet of the optical film of the invention.

The polarizing plate of the invention may be produced by an ordinary method. For example, the polarizing plate may be produced by adhering a polarizer on one surface of the optical film of the invention. The adhesion surface of the optical film is preferably subjected to an alkali saponification treatment. A fully saponified polyvinyl alcohol aqueous solution may be used for the adhesion.

The polarizer used in the polarizing plate may be any ordinary one. Examples thereof include a polarizer obtained by treating a film formed of a hydrophilic polymer, such as polyvinyl alcohol or ethylene-modified polyvinyl alcohol having an ethylene unit content of from 1 to 4% by mol, a polymerization degree of from 2,000 to 4,000 and a saponification degree of from 99.0 to 99.99% by mol, with a dichroic dye, such as iodine, followed by stretching, and a polarizer obtained by treating and orienting a plastic film, such as polyvinyl chloride.

The thickness of the polarizer used is preferably from 5 to 30 μm. The polarizer thus obtained is adhered to the optical film of the invention. When the thickness of the polarizer is reduced, the durability of the polarizer is liable to be deteriorated, but the optical film of the invention may improve the durability of the polarizer under a high temperature and high humidity condition, and thus the optical film is preferably applied to the case where the polarizer has a reduced thickness. In particular, the optical film of the invention is preferably adhered to a polarizer having a thickness of from 5 to 20 μm, and more preferably adhered to a polarizer having a thickness of from 5 to 15 μm.

On the surface of the polarizer opposite to the surface having the optical film of the invention adhered, another optical film according to the invention may be adhered, or a known optical film may be adhered.

While the known optical film used is not limited in the optical characteristics and the material thereof, optical films formed of an acrylic resin and/or a cyclic olefin resin may be preferably used, and both an optically isotropic film and an optically anisotropic retardation film may be used.

Examples of the known optical film that contains a cellulose ester resin include Fujitac TD40UC (available from Fujifilm Corporation).

Examples of the known optical film that contains an acrylic resin include the optical film containing a (meth) acrylic resin containing a styrene resin described in Japanese Patent No. 4,570,042, the optical film containing a (meth) acrylic resin having a glutarimide ring structure in the main chain thereof described in Japanese Patent No. 5,041,532, the optical film containing a (meth)acrylic resin having a lactone ring structure described in JP-A-2009-122664, and the optical film containing a (meth) acrylic resin having a glutaric anhydride unit described in JP-A-2009-139754.

Examples of the known optical film that contains a cyclic olefin resin include the cyclic olefin resin film described in JP-A-2009-237376, paragraphs 0029 et seq., and the cyclic olefin resin film containing an additive that reduces Rth described in Japanese Patent No. 4,881,827 and JP-A-2008-063536.

In an embodiment where the polarizing plate according to the invention is used in a liquid crystal display device, both cases may be preferred where the optical film of the invention is disposed on the inner side of the polarizer (i.e., between the polarizer and the liquid crystal cell) and on the outer side of the polarizer (i.e., on the side of the polarizer opposite to the liquid crystal cell), and the optical film of the invention is preferably disposed between the polarizer and the liquid crystal cell.

Liquid Crystal Display Device

The liquid crystal display device of the invention has a liquid crystal cell and two polarizing plates disposed on both sides of the liquid crystal cell. At least one of the polarizing plates is the polarizing plate of the invention. The function of the optical film of the invention in the liquid crystal display device is not particularly limited. One example of the position where the optical film of the invention is disposed is a surface protective film of a polarizing plate disposed on the side of the backlight of the liquid crystal display device having no hardcoat layer, in which the surface protective film is disposed between the polarizer and the liquid crystal cell (i. e., on the surface of the polarizer on the side of the liquid crystal cell). Another example of the position where the optical film of the invention is disposed is a surface protective film of a polarizing plate disposed on the side of the display surface of the liquid crystal display device having no hardcoat layer, in which the surface protective film is disposed between the polarizer and the liquid crystal cell (i. e., on the surface of the polarizer on the side of the liquid crystal cell). Thus, in the liquid crystal display device of the invention, the optical film of the invention is preferably disposed between a polarizer and a liquid ¥crystal cell.

The other structures and materials of the liquid crystal display device may be ones that are known for known liquid crystal display devices. The display mode of the liquid crystal cell is not particularly limited, and liquid crystal display devices having various display modes are included, such as TN (twisted nematic) mode liquid crystal cell, IPS (in-plane switching) mode liquid crystal cell, FLC (ferroelectric liquid crystal) mode liquid crystal cell, AFLC (anti-ferroelectric liquid crystal) mode liquid crystal cell, OCB (optically compensatory bend) mode liquid crystal cell, STN (super twisted nematic) mode liquid crystal cell, VA (vertically aligned) mode liquid crystal cell and HAN (hybrid aligned nematic) mode liquid crystal cell. The liquid crystal cell used in the liquid crystal display device of the invention is preferably an in-plane switching IPS mode liquid crystal cell,

EXAMPLES

The features of the invention will be described in more detail with reference to examples below. The materials, the amounts and ratios thereof used, the contents of processes, the procedures of processes, and the like in the examples may be modified as far as they do not deviate from the substance of the invention. Accordingly, the invention is not construed as being limited to the following examples.

Example 1

Production of Cellulose Acylate Dope for Core Layer

The following components were placed in a mixing tank and dissolved with agitation to prepare a cellulose acetate solution which was to be used as a cellulose acylate dope for a core layer:

<Cellulose Acylate Dope for Core Layer>

| | |
|---|---|
| Cellulose acetate having acetylation degree of 2.88 | 100 parts by mass |
| Polyester A | 12 parts by mass |
| Durability Improving Agent for Polarizer (Poem K-37V, available from Riken Vitamin) | 2 parts by mass |
| Methylene chloride (first solvent) | 430 parts by mass |
| Methanol (second solvent) | 64 parts by mass |

Poem K-37V which is a durability improving agent for a polarizer used in Example 1 is a glycerin citric acid oleic acid ester.

The following Table 1 shows the structure of polyester A used in Example 1 and the structures of polyesters used in the below-described Examples and Comparative Examples.

TABLE 1

| | Molar Content [%] | | | | | | | | | |
|---|---|---|---|---|---|---|---|---|---|---|
| | Dicarboxylic Acid | | | | | Diol | | | Terminal | |
| Polyester | 1,2-CHA | 4Me-1,2-CHA | TPA | AA | SA | EG | PG | Mn | Structure | Note |
| A | 50 | 0 | 0 | 0 | 0 | 50 | 0 | 750 | Ac | Invention |
| B | 50 | 0 | 0 | 0 | 0 | 50 | 0 | 850 | CHA | Invention |
| C | 0 | 50 | 0 | 0 | 0 | 50 | 0 | 1000 | Ac | Invention |
| D | 0 | 50 | 0 | 0 | 0 | 50 | 0 | 800 | CHA | Invention |
| E | 25 | 25 | 0 | 0 | 0 | 50 | 0 | 1200 | Ac | Invention |
| F | 0 | 45 | 0 | 5 | 0 | 50 | 0 | 950 | Ac | Invention |
| G | 0 | 0 | 0 | 50 | 0 | 50 | 0 | 1000 | Ac | Comparative |
| H | 50 | 0 | 0 | 0 | 0 | 25 | 25 | 980 | OH | Comparative |
| I | 0 | 0 | 27.5 | 0 | 22.5 | 25 | 25 | 1200 | Ac | Comparative |

The abbreviations in Table 1 have the following meanings: 1,2-CHA: 1,2-cyclohexanedicarboxylic acid 4-Me-1,2-CHA: 4-methyl-1,2-cyclohexanedicarboxylic acid
TPA: terephthalic acid
AA: adipic acid
SA: succinic acid
EG: ethylene glycol
PG: propylene glycol
Mn: number average molecular weight
The abbreviations in the terminal structure of Table 1 have the following meanings:
CHA: the hydrogen atoms of the hydroxyl groups in both terminals of the polyester are substituted (blocked) with a cyclohexyanoyl group
Ac: the hydrogen atoms of the hydroxyl groups in both terminals of the polyester are substituted (blocked) with an acetyl group OH: the both terminals of the polyester are a hydroxyl group Production of Cellulose Acylate Dope for Outer Layer 10 parts by mass of a matting agent solution shown below was added to 90 parts by mass of the cellulose acylate dope for core layer produced above to prepare a cellulose acetate solution which was to be used as a cellulose acetate solution for an outer layer.

<Matting Agent Solution>

| | |
|---|---|
| Silica particles having average particle diameter of 20 nm (Aerosil R972, available from Nippon Aerosil Co., Ltd.) | 2 parts by mass |
| Methylene chloride (first solvent) | 76 parts by mass |
| Methanol (second solvent) | 11 parts by mass |
| Cellulose acylate dope for core layer | 1 part by mass |

Production of Optical Film

The cellulose acylete dope for core layer and the cellulose acylate dope for outer layer were filtered with filter paper having an average pore diameter of 34 μm and a sintered metal filter having an average pore diameter of 10 μm, and cast simultaneously for three layers from the casting outlets onto a drum at 20° C. (band casting machine) in such a manner that the outer layer cellulose acylate dope was cast on both sides of the core layer cellulose acylate dope. The film was released in the state where the solvent content thereof was 20% by mass, and the film was dried while stretching by the stretching ratio of 1.1 times in the direction perpendicular to the film conveying direction with both edges of the film being fixed with tenter clips. Thereafter, the film was further dried by conveying among rolls of a heat treatment device, thereby producing an optical film having a thickness of 18 μm, which was designated as an optical film of Example 1. The optical film of Example 1 has a core layer of 16 μm thick and outer layers of 2 μm thick disposed on both sides of the core layer.

Examples 2 to 12 and Comparative Examples 1 to 6

Optical films of Examples 2 to 12 and Comparative Examples 1 to 6 were produced in the same manner as in the production of the optical film of Example 1 except that the kind and the amount of the polyester used in the optical film, the kind and the amount of the durability improving agent for a polarizer and the thickness of the film were changed as shown in Table 2.

In Comparative Example 5, the polyester described in Example 1 of WO 2014/027594 was used. In Comparative Example 6, the polyester referred to as Polyester A in JP-A-2012-72348 (which is referred to as Polyester I in this specification) was used.

Compound A-3 used as a durability improving agent for a polarizer has the following structure:

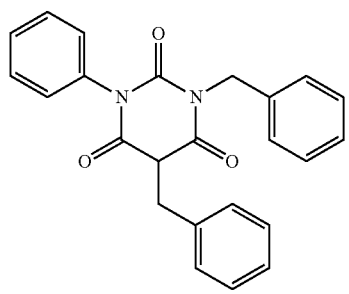

A-3

Evaluation
Evaluation of Optical Films

The optical films of Examples and Comparative Examples were subjected to the following evaluation. The results of the evaluation are shown in Table 2.

Optical Performance

The optical films of Examples and Comparative Examples each were measured for retardation at a wavelength of 590 nm with KOBRA 21ADH (available from Oji Scientific Instruments Co., Ltd.) after storage under an environment of 25° C. and 60% RH for 1 hour.

Evaluation of Polarizing Plate
Production of Polarizing Plate
(1) Saponification of Film The optical films of Examples and Comparative Examples and Fujitac TD40UC (available from Fujifilm Corporation) each were immersed in a 4.5 mol/L sodium hydroxide aqueous solution (saponification solution) controlled to 37° C. for 1 minute, washed with water, subsequently immersed in a 0.05 mol/L sulfuric acid aqueous solution for 30 seconds and then rinsed in a water bath. The optical films each were dehydrated by subjecting to draining with an air knife three times, and then dried by retaining in a drying zone at 70° C. for 15 seconds, thereby producing saponified films.

(2) Production of Polarizer

The film was stretched in the film conveying direction by passing through two pairs of nip rolls, to which a difference in circumferential speed was applied, according to Example 1 of JP-A-2001-141926, thereby preparing a polarizer having a thickness of 15 μm.

(3) Adhesion

Two sheets were selected from the aforementioned saponified optical films and were disposed on both sides of the polarizer, and the films were adhered to each other by a roll-to-roll process with a 3% PVA aqueous solution of polyvinyl alcohol (PVA-117H, available from Kuraray Co., Ltd.) as an adhesive in such a manner that the polarizing axis of the polarizer was perpendicular to the film conveying direction (machine direction) of the optical films, thereby producing a polarizing plate. In the polarizing plate, the film on one side of the polarizer was one selected from the saponified films obtained by saponifying the optical films of Examples and Comparative Examples, and the film on the other side of the polarizer was the film obtained by saponifying Fujitac TD40UC (available from Fujifilm Corporation).

Evaluation of Polarizer Durability

The polarizing plates thus produced above each were adhered on the side of the optical films of Examples and Comparative Examples to a glass plate with a pressure-sensitive adhesive, thereby preparing two pairs of specimens each having a size of approximately 5 cm×5 cm. The specimens were disposed to form crossed nicols, which were measured for crossed nicols transmittance at a wavelength of 410 nm and 730 nm with an automatic polarizing film measuring machine, VAP-7070, available from Jasco Corporation. Thereafter, the specimens having been stored under a high temperature high humidity environment of 85° C. and 85% RH for 24 hours were measured for crossed nicols transmittance in the same manner as above. The polarizer durability of the polarizing plate is defined by the change rate of the crossed nicols transmittance as follows.

evaluation value of polarizer durability of polarizing plate=[(crossed nicols transmittance after storing (%))−(crossed nicols transmittance before storing (%))]/(crossed nicols transmittance before storing (%))

The polarizing plate is free of any practical problem when the evaluation value of the polarizer durability of the polarizing plate at 410 nm is 10 or less, and the evaluation value of the polarizer durability is preferably 8 or less, and more preferably 7 or less.

The polarizing plate is free of any practical problem when the evaluation value of the polarizer durability of the polarizing plate at 730 nm is 6 or less, and the evaluation value of the polarizer durability is preferably 4 or less, and more preferably 3 or less.

The results obtained are shown in Table 2.

Evaluation of Liquid Crystal Display Device
Evaluation on mounting in IPS Liquid Crystal Display Device In commercially available liquid crystal television sets (an IPS mode low-profile 42-inch liquid crystal television set), the polarizing plates holding the liquid crystal cell were peeled off from the liquid crystal cell, and the polarizing plates of Examples and Comparative Examples produced by the above process each were adhered again with a pressure-sensitive adhesive to the liquid crystal cell with the side of the optical films of Examples and Comparative Examples shown in Table 2 below directed to the side of the liquid crystal cell. The thus refabricated television sets each were evaluated for the display characteristics by observing the luminance and the color tone from the front and the diagonal direction with the following standard.
A: The display characteristics were equivalent to the original commercially available television set for the luminance and the color tone from the front and the diagonal direction.
B: The display characteristics were inferior to the original commercially available television set for the luminance and the color tone from the diagonal direction.

The grade A is practically required.
The results obtained are shown in Table 2 below.

Evaluation of Application to Polarizing Plate after Durability Test and Durability Evaluation of Application to IPS Liquid Crystal Display Device In commercially available liquid crystal television sets (an IPS mode low-profile 42-inch liquid crystal television set), the polarizing plates holding the liquid crystal cell were peeled off from the liquid crystal cell, and the polarizing plates produced above each were adhered again with a pressure-sensitive adhesive to the liquid crystal cell with the side of the optical films of Examples and Comparative Examples directed to the side of the liquid crystal cell. The thus refabricated television sets each were retained under an environment of 85° C. and 85% RH for 24 hours, and then transferred to an environment of 25° C. and 60% RH, in which the television sets were being turned on with a black solid image displayed, and visually evaluated after 48 hours.

The television sets were observed from the front thereof and evaluated with the following standard.
AA: The contrast was substantially not changed from before the durability test, and the image was clearly confirmed.
A: The contrast was slightly reduced from before the durability test, and the image was confirmed without any problem.
B: The contrast was somewhat reduced from before the durability test (the reduction in contrast was larger than the grade A but was not clearer than in the grade C), and the image was slightly unclear.
C: The contrast was clearly reduced from before the durability test, and the image was unclear.

The grades AA, A and B are practically required, the grades AA and A are preferred, and the grade AA is more preferred.

The results obtained are shown in Table 2.

TABLE 2

| | Polyester [mass % based on cellulose ester] | | | | | | | | | Durability Improving Agent for Polarizer [mass % based on cellulose ester] | | Thickness of Film [μm] |
|---|---|---|---|---|---|---|---|---|---|---|---|---|
| | A | B | C | D | E | F | G | H | I | Poem K-37V | A-3 | |
| Example 1 | 12 | | | | | | | | | 2 | | 20 |
| Example 2 | 15 | | | | | | | | | | 2 | 20 |
| Example 3 | | | 14 | | | | | | | 2 | | 15 |
| Example 4 | | | | 12 | | | | | | 3 | | 20 |
| Example 5 | | | | 13 | | | | | | 2 | 2 | 15 |
| Example 6 | | | | | 11 | | | | | 3 | | 18 |
| Example 7 | | | | | | 13 | | | | | 2 | 18 |
| Example 8 | | | | | | 13 | | | | | 3 | 20 |
| Example 9 | | | | | | 14 | | | | 2 | | 20 |
| Example 10 | | | | | | 12 | | | | 3 | 3 | 20 |
| Example 11 | | | | | | | 15 | | | | 2 | 25 |
| Example 12 | | | | | | | | 10 | | | 3 | 20 |
| Comparative Example 1 | 13 | | | | | | | | | | | 20 |
| Comparative Example 2 | | | | | 12 | | | | | | | 15 |
| Comparative Example 3 | | | | | | 13 | | | | 3 | | 20 |
| Comparative Example 4 | | | | | | 14 | | | | | 3 | 20 |
| Comparative Example 5 | | | | | | | 15 | | | | 2 | 20 |
| Comparative Example 6 | | | | | | | | | 12 | | 2 | 20 |

| | Retardation [nm] | | Evaluation Value of Polarizer Durability in Polarizing Plate | | Evaluation of Application to Polarizing Plate before Durability Test | Evaluation of Application to Polarizing Plate after Durability Test |
|---|---|---|---|---|---|---|
| | Re | Rth | 410 nm | 730 nm | | |
| Example 1 | 0 | 0 | 5 | 2 | A | A |
| Example 2 | 0 | −2 | 6 | 3 | A | A |

TABLE 2-continued

| | | | | | | |
|---|---|---|---|---|---|---|
| Example 3 | 0 | 0 | 6 | 3 | A | A |
| Example 4 | 0 | −1 | 4 | 1 | A | AA |
| Example 5 | 0 | −1 | 4 | 1 | A | AA |
| Example 6 | 0 | 0 | 4 | 1 | A | AA |
| Example 7 | 0 | −1 | 3 | 2 | A | AA |
| Example 8 | 0 | −2 | 3 | 1 | A | AA |
| Example 9 | 0 | −1 | 3 | 1 | A | AA |
| Example 10 | 0 | −2 | 2 | 1 | A | AA |
| Example 11 | 0 | −1 | 4 | 3 | A | A |
| Example 12 | 0 | −2 | 6 | 5 | A | A |
| Comparative Example 1 | 0 | 1 | 8 | 7 | A | B |
| Comparative Example 2 | 0 | 1 | 20 | 28 | A | C |
| Comparative Example 3 | 0 | −2 | 13 | 9 | A | C |
| Comparative Example 4 | 0 | −3 | 16 | 18 | A | C |
| Comparative Example 5 | 0 | −2 | 11 | 9 | A | C |
| Comparative Example 6 | 1 | 16 | 12 | 9 | B | C |

It was understood from Table 2 that the optical films of Examples 1 to 12 achieved a thin film thickness, and were capable of achieving simultaneously both optical characteristics with a low retardation and high durability of a polarizer under a high temperature and high humidity environment on application as a polarizing plate protective film to a polarizing plate.

The results in Table 2 will be described more specifically below.

The optical film of Comparative Example 6 had Rth exceeding the upper limit determined in the invention. In the application test of a polarizing plate before the durability test, the liquid crystal television set refabricated by changing to the polarizing plate of Comparative Example 6 produced by using the optical film of Comparative Example 6 having Rth exceeding the upper limit determined in the invention suffered large color tone change viewed from the diagonal direction, and thus was confirmed to have deteriorated display characteristics. The liquid crystal television sets refabricated by changing to the polarizing plates of Examples 1 to 12 and Comparative Examples 1 to 5 each exhibited display characteristics equivalent to the original commercially available television set before peeling off and changing the polarizing plates.

The optical films of Examples 1 to 12 each had a small change in orthogonal transmission and had good durability of the polarizer under a high temperature and high humidity environment. The optical films of Comparative Examples 2 to 6 had a large change in orthogonal transmission with the lapse of time, and suffered significant decoloration of the polarizer, and thus it was found that the optical films had a problem in durability of the polarizer under a high temperature and high humidity environment. The optical film of Comparative Example 1 had no problem in change in orthogonal transmission at 410 nm with the lapse of time, but had a large change in orthogonal transmission at 730 nm with the lapse of time and had poor durability, and thus it was found that the optical film had a practical problem in use under a high temperature and high humidity environment. In the application test of a polarizing plate after the durability test, the liquid crystal display devices using the polarizing plates of Examples 1 to 12 were able to display the image clearly even after the durability test, but the liquid crystal display devices using the polarizing plates of Comparative Examples 1 to 6 were reduced in contrast as compared to before the durability test, and it was confirmed that the images displayed thereby were unclear.

While the invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 113535/2014, filed on May 30, 2014, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. An optical film containing:

a cellulose ester, a polyester having a recurring unit represented by the formula 1A below and having a blocked terminal, and a durability improving agent for a polarizer, wherein:

the optical film has a thickness of from 10 to 45 μm, the optical film has an in-plane retardation, Re, of from −5 to 5 nm at a wavelength of 590 nm under an environment of 25° C. and a relative humidity of 60%, the optical film has a retardation in thickness direction, Rth, of from −5 to 5 nm at a wavelength of 590 nm under an atmosphere at 25° C. and a relative humidity of 60%, the polyester is contained in an amount of from 5 to 20% by mass based on the amount of the cellulose ester, the polyester has a hydroxyl group value of 1 mgKOH/g or less, and the durability improving agent for a polarizer is a compound represented by the following formula (21):

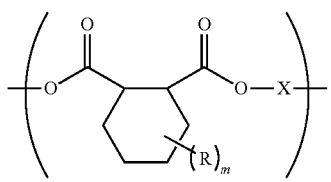

Formula 1A wherein X represents an acyclic divalent linking group having from 2 to 10 carbon atoms, R represents an alkyl group having from 1 to 8 carbon atoms, an alkenyl group having from 2 to 8 carbon atoms, an alkynyl group having from 2 to 8 carbon atoms, or an aryl group having 6 carbon atoms, R may form a cyclic structure and may have a substituent; the above numbers of carbon atoms do not include the number of carbon atoms in a substituent the group represented by R may further have; and m represents an integer of from 0 to 4, and

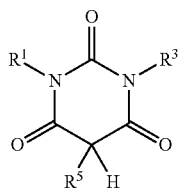

Formula (21)

wherein each of $R^1$ and $R^3$ independently represents a hydrogen atom, an alkyl group, a cycloalkyl group, an alkenyl group or an aromatic group, and wherein $R^5$ represents an alkyl group which is substituted by a group having a cyclic structure, and wherein the total number of cyclic structures present in $R^1$, $R^3$ and $R^5$ is 3 or more.

2. The optical film according to claim 1 wherein the polyester has a number average molecular weight, Mn, of from 500 to 3000.

3. The optical film according to claim 1 wherein the terminal of the polyester is blocked with an acyl group.

4. The optical film according to claim 3 wherein the acyl group is a linear or branched aliphatic acyl group or an alicyclic acyl group having 4 to 12 carbon atoms.

5. A polarizing plate containing a polarizer and at least one sheet of the optical claim 1.

6. A liquid crystal display device containing a liquid crystal cell and two polarizing plates disposed on both sides of the liquid crystal cell, wherein at least one of the polarizing plates is the polarizing plate of claim 5.

7. The liquid crystal display device according to claim 6, wherein the liquid crystal cell is an in-plane switching IPS mode liquid crystal cell.

8. The liquid crystal display device according to claim 6, wherein the optical claim 1 is disposed between the polarizer and the liquid crystal cell.

9. The liquid crystal display device according to claim 6, wherein the evaluation value of the polarizer durability of the polarizing plate at 410 nm is 8 or less and the evaluation value of the polarizer durability of the polarizing plate at 730 nm is 6 or less.

10. The liquid crystal display device according to claim 6, wherein the tensile modulus of the optical film is from 4.5 to 10 GPa.

* * * * *